(12) United States Patent
Robinson et al.

(10) Patent No.: US 7,987,912 B2
(45) Date of Patent: Aug. 2, 2011

(54) REVERSIBLE POLYMERIC GELATION FOR OILFIELD APPLICATIONS

(75) Inventors: Kay Louise Robinson, Milton (GB);
Maria Violante De Paz Banez, Seville (ES); Gary John Tustin, Sawston (GB);
Timothy Gareth John Jones, Cottenham (GB)

(73) Assignee: Schlumberger Technology Corporation, Cambridge, MA (US)

( * ) Notice: Subject to any disclaimer, the term of this patent is extended or adjusted under 35 U.S.C. 154(b) by 368 days.

(21) Appl. No.: 12/238,107

(22) Filed: Sep. 25, 2008

(65) Prior Publication Data

US 2009/0126932 A1    May 21, 2009

(30) Foreign Application Priority Data

Sep. 25, 2007 (GB) .................. 0718667.9

(51) Int. Cl.
*E21B 43/22* (2006.01)
*E21B 43/04* (2006.01)
*E21B 43/26* (2006.01)

(52) U.S. Cl. ........ 166/300; 166/278; 166/279; 166/294; 166/308.5

(58) Field of Classification Search .................. None
See application file for complete search history.

(56) References Cited

U.S. PATENT DOCUMENTS

| | | | |
|---|---|---|---|
| 4,946,626 A | 8/1990 | Veazey et al. | |
| 5,292,480 A | 3/1994 | Fischer et al. | |
| 5,489,451 A | 2/1996 | Omeis et al. | |
| 5,844,020 A | 12/1998 | Paine et al. | |
| 6,291,131 B1 | 9/2001 | Jung et al. | |
| 6,825,315 B2 | 11/2004 | Aubert | |
| 6,933,361 B2 | 8/2005 | Wudl et al. | |
| 2004/0014933 A1 | 1/2004 | Wudl et al. | |
| 2004/0266954 A1 | 12/2004 | Jen et al. | |
| 2005/0176922 A1 | 8/2005 | McManus et al. | |

FOREIGN PATENT DOCUMENTS

DE       4104319 A1   8/1992
WO   2005056636 A2   6/2005

OTHER PUBLICATIONS

Bibiao et al, Synthesis and properties of novel polybismaleimide oligomers, European Polymer Journal, 2001, pp. 463-470, vol. 37.
Breslow, Hydrophobic effects on simple organic reactions in water, Accounts of Chemical Research, 1991, pp. 159-164. vol. 24.
Chen et al, A thermally re-mendable cross-linked polymeric material, Science, 2002, pp. 1698-1702, vol. 295.
Chen et al, New Thermally Re-mendable Cross-Linked Polymeric Materials, Macromolecules, 2003, pp. 1802-1807, vol. 36.
Chujo et al, Reversible gelation of polyoxazoline by means of Diels-Alder reaction, Macromolecules, 1990, pp. 2636-2641, vol. 23.
Tutas et al, Investigation of pyrolysis products of polyacrylamide by pyrolysis-gas chromatography, Journal of Analytical and Applied Pyrolysis, 1991, pp. 129-137, voL. 22.
Fringuelli et al, The Diels-Alder reaction. Selected Practical Methods. John Wiley & Sons, 2002, pp. 205-206 and pp. 251-268.

(Continued)

*Primary Examiner* — Zakiya Bates
(74) *Attorney, Agent, or Firm* — Helene Raybaud; Brigid Laffey

(57) ABSTRACT

A subterranean location accessed via a wellbore is treated with an oilfield fluid containing a viscosifying agent which is a polymer and a cross-linking agent which can undergo the Diels-Alder reaction to form a gel. Conditions at the subterranean location alter fluid viscosity by bringing about the Diels-Alder reaction to increase viscosity or the retro Diels-Alder reaction to decrease the viscosity of the gel.

30 Claims, 6 Drawing Sheets

OTHER PUBLICATIONS

Gheneim et al, Diels-Alder reactions with novel polymeric dienes and dienophiles: Synthesis of reversibly cross-linked elastomers, Macromolecules, 2002, pp. 7246-7253, vol. 35.

Goiti et al, Kinetic aspects of the Diels-Alder reaction between poly-(styrene-co-furfuryl methacrylate) and bismaleimide, European Polymer Journal, 2004. pp. 1451-1460, vol. 40.

Goiti et al, Some properties of networks produced by the Diels-Alder reaction between poly(styrene-co-furfuryl methacrylate) and bismaleimide, European Polymer Journal, 2004, pp. 219-226, vol. 40.

Goiti et al, Some observations on the copolymerization of styrene with furfuryl methacrylate, Polymer, 2001, pp. 10187-10193, vol. 42.

Goiti et al, Thermal breakdown by the retro Diels-Alder reaction of crosslinking in poly[styrene-co-(furfuryl methacrylate)], Macromolecular Rapid Communications, 2003, pp. 692-696, vol. 24.

Gousse et al, Application of the Diels-Alder reaction to polymers bearing furan moieties. 2. Diels-Alder and retro-Diels-Alder reactions involving furan rings in some styrene copolymers, Macromolecules, 1998, pp. 314-321, vol. 31.

Jones et al, Cross-linking and modification of poly(ethylene terephthalate-co-2,6-anthracenedicarboxylate) by Diels-Alder reactions with maleimides, Macromolecules, 1999, pp. 5786-5792, vol. 32.

Kamahori et al, Optically active polymer synthesis by Diels-Alder polymerization with chirally modified Lewis acid catalyst, Macromolecules, 1999, pp. 541-547, vol. 32.

Lui et al, Thermally reversible cross-linked polyamides and thermoresponsive gels by means of Diels-Alder reaction, Polymer, 2006, pp. 2581-2586, vol. 47.

McElhanon et al, Thermally responsive dendrons and dendrimers based on reversible furan-maleimide Diels-Alder adducts, Organic Letters, 2001, pp. 2681-2683, vol. 3.

Mikroyannidis, Furyl-maleimide in situ generated AB-monomers: Synthesis, characterization, and Diels-Alder polymerization, Journal of Polymer Science, Part A, 1992, pp. 2017-2024, vol. 30.

Rideout et al, Hydrophobic acceleration of Diels-Alder reactions, Journal of the American Chemical Society, 1980, pp. 7816-7817, vol. 102.

Stille et al, Polymerization by the Diels-Alder reaction, The Journal of Organic Chemistry, 1961, pp. 4026-4029, vol. 26.

REVERSIBLE POLYMERIC GELATION FOR OILFIELD APPLICATIONS

FIELD OF THE INVENTION

Embodiments of the present invention relate to the synthesis and use in oilfield applications of copolymers which can undergo the Diels-Alder reaction to form a gel. More specifically, but not by way of limitation, the co-polymers may be configured to undergo the retro Diels-Alder reaction under certain conditions in oilfield applications to provide for decreasing/controlling the viscosity of the aforementioned gel.

BACKGROUND OF THE INVENTION

Since its discovery in 1928 (Diels, O.; Alder, K. *Liebigs Ann. Chem.* 1928, 460, 98-122) more than 17,000 papers have been published concerning the synthetic, mechanistic and theoretical aspects of the Diels-Alder reaction (Fringuelli, F.; Taticchi, A. *The Diels-Alder Reaction* 2002, John Wiley & Sons Ltd.). This [4+2]cycloaddition reaction in which a conjugated diene adds to a dienophile is probably the most widely used methodology in organic synthesis today.

Many conjugated dienes and dienophiles have been reported for use in the Diels-Alder reaction. Dienes will react as long as the two double bonds have, or can assume, a cisoid geometry. For this reason cyclic dienes are generally more reactive than the acyclic ones since their cisoid geometry is fixed. Dienophiles, which are much more numerous than dienes, are molecules possessing a double or triple bond.

The Diels-Alder reaction is reversible and the direction of cycloaddition is favoured because two π bonds are replaced by two σ bonds. The reverse reaction occurs if the diene and/or dienophile are particularly stable molecules or when one of them can be easily removed or consumed in a subsequent reaction. The retro Diels-Alder reaction usually requires high temperatures in order to overcome the high activation barrier.

The Diels-Alder reaction is used frequently in organic chemistry, but has also received some attention in polymer chemistry. Polymers have been synthesised via consecutive Diels-Alder reactions in various ways. Mikroyannidis et al. reported the Diels-Alder reaction between AA/BB monomers, where AA is a monomer having reactive diene groups and BB is a monomer having reactive dienophile groups (Mikroyannidis, J. A. *J. Polym. Sci. Part A—Polym. Chem.* 1992, 30, 2017-2024).

Kamahori et al. described the synthesis of alternate polymers via the Diels-Alder polymersation of difurfuryl terephthalate—a bisdiene (AA) with N,N'-hexamethylene bismaleimide—a bisdienophile (BB) (Kamahori, K; Tada, S.; Ito, K.; Itsuno, S. *Macromolecules* 1999, 32, 541-547). By choosing the right ratio of the two monomers, optically active polymers could be prepared. Finally, the Diels-Alder reaction has been used for AB monomers, where the monomer behaves both as a diene and a dienophile, e.g. a cyclopentadiene group (Stille, J. K.; Plummer, L. *J. Org. Chem.* 1961, 26, 4026-4029).

Another interesting application of this reaction in polymers is the formation of thermally reversible networks. Polymers bearing pendant diene or dienophile groups have been cross-linked by reaction with a bisdienophile or a bisdiene respectively. Goussé et al. reported the synthesis of styrene copolymers bearing pendant furan moieties and their Diels-Alder based modifications with mono or bismaleimide (Goussé, C.; Gandini, A.; Hodge, P. *Macromolecules* 1998, 31, 314-321). The reaction proceeded as expected and the original copolymers could be recovered after thermal treatment. Jones et al. reported the synthesis of poly(ethylene terephthalate-co-2,6-anthracenedicarboxylate), where the anthracene unit was then used as a diene for the Diels-Alder reaction with various bisdienophiles (Jones, J. R.; Liotta, C. L.; Collard, D. M.; Schiraldi, D. A. *Macromolecules* 1999, 32, 5786-5792). This crosslinking reaction was thermally reversible, but at the temperature required (250° C.), the copolymer was prone to thermal decomposition. The synthesis of poly(hexyl acrylate-2-furfuryl methacrylate) copolymers was reported by Gheneim et al. (Gheneim, R.; Perez-Berumen, C.; Gandini, A. *Macromolecules* 2002, 35, 7246-7253). These copolymers produced cross-linked elastomers in high yields on addition of bismaleimides in dichloromethane. The thermal reversibility of this reaction was also confirmed. Liu et al. (Liu, Y. L.; Hsieh, C. Y.; Chen, Y. W. *Polymer* 2006, 47, 2581-2586) prepared cross-linked polyamides and polyamide gels from maleimide having polyamides and a trifunctional furan compound. The crosslinking and gel formation in dimethyl acetamide was shown to be thermally reversible, and this reversibility could be adjusted by the content of maleimide groups in the polyamide. Similarly, thermally re-mendable cross-linked polymeric materials have been reported by Chen et al. (Chen, X.; Wudl, F.; Mal, A. K.; Shen, H.; Nutt, S. R. *Macromolecules* 2003, 36, 1802-1807 and Chen, X.; Dam, M. A.; Ono, K.; Mal, A.; Shen, H.; Nutt, S. R.; Sheran, K.; Wudl, F. *Science* 2002, 295, 1698-1702).

All the above examples concern the Diels-Alder reaction between one modified copolymer having a diene or a dienophile, with a small molecule bisdienophile or bisdiene crosslinker. Chujo et al. reported the Diels-Alder reaction between two modified copolymers, one having a dienophile—maleimide modified poly(N-acetylethylenimine) and the other having a diene—furan modified poly(N-acetylethylenimine) (Chujo, Y.; Sada, K.; Saegusa, T. *Macromolecules* 1990, 23, 2636-2641). These two copolymers were dissolved in methanol and left under dark conditions at room temperature for 1 week, in which time a gel formed. The gel swelled in water to form a hydrogel, and the reversible interconversion between this polyoxazoline hydrogel and the linear soluble polymers by a change in temperature was described. Huglin's group published their work on the synthesis of poly (styrene-co-furfuryl methacrylate) copolymers and the subsequent Diels-Alder and retro Diels-Alder reactions of these polymers with 1,2'-(methylendi-4,1-phenylene)bismaleimide in chloroform (Goiti, E.; Huglin, M. B.; Rego, J. M. *Polymer* 2001, 42, 10187-10193; Goiti, E.; Huglin, M. B.; Rego, J. M. *Macromol. Rapid Commun.* 2003, 24, 692-696; Goiti, E.; Huglin, M. B.; Rego, J. M. *Eur. Polym. J.* 2004, 40, 219-226; and Goiti, E.; Huglin, M. B.; Rego, J. M. *Eur. Polym. J.* 2004, 40, 1451-1460). The forward reaction occurred over time at room temperature, then on heating to 77° C. and above, the retro D-A process took place (Goiti, E.; Huglin, M. B.; Rego, J. M. *Macromol. Rapid Commun.* 2003, 24, 692-696).

As can be seen from the literature examples given above, the furan ring is one of the most important heterocycles used as the diene in Diels-Alder reactions. Furfural is an industrial commodity obtained from a wide variety of agricultural residues, and the pronounced dienic nature of the furan ring makes is particularly suitable in terms of kinetics and yields (Gheneim, R.; Perez-Berumen, C.; Gandini, A. *Macromolecules* 2002, 35, 7246-7253). On the dienophile side, maleimides are among the most commonly used reagents because of their high reactivity. The electron-attracting substituents attached to the double bond in maleimides promote the Diels-Alder reaction with furan compounds (Gheneim, R.; Perez-Berumen, C.; Gandini, A. *Macromolecules* 2002, 35, 7246-7253). The Diels-Alder reaction between a difuran and a bis(maleimide) has been used to obtain imide resins (Bibiao, J.; Jianjun, H.' Wenyun, W.; Luxia, J.; Xinxian, C. *Eur. Polym. J.* 2001, 37, 463-470), optically active materials (Kamahori, K, Tada, S., Ito, K., Itsuno, S. *Macromolecules* 1999, 32, 541-547), and even to synthesis of dendrons based on the furan-maleimide adducts (McElhanon, J. R.; Wheeler, D. R. *Org. Lett.* 2001, 3, 2681-2683). However, all of the literature examples of using the Diels-Alder reaction in polymer chemistry are carried out in organic solvent. No studies have been reported of using aqueous media for the Diels-Alder crosslinking. In 1980 Rideout et al. showed that some Diels-Alder reactions were vastly accelerated (up to 700 times faster) when carried out in aqueous media (Rideout, D. C.; Breslow, R. *J. Am. Chem. Soc.* 1980, 102, 7816-7817). When reacting anthracene-9-carbinol with N-ethylmaleimide they found the reaction to be slower in polar solvents than in nonpolar hydrocarbon solution, with the exception of water where the rate was very fast. This acceleration was therefore put down to a hydrophobic effect—enforced hydrophobic interactions and hydrogen bond interactions—rather than a polarity effect.

BRIEF SUMMARY OF THE INVENTION

Embodiments of the present invention relate to the synthesis and use in oilfield/hydrocarbon applications of copolymers which can undergo the Diels-Alder reaction to form a gel. Under appropriate conditions, the retro Diels-Alder reaction can take place, decreasing the viscosity of the aforementioned gel. In certain aspects of the present invention, the copolymers may be configured in a fluid to undergo the Diels-Alder reaction in an oilfield application. Merely by way of example, the Diels-Alder reaction may be used in hydrocarbon recovery/production to prepare fluids whose viscosity can be changed reversibly, leaving little or no formation damage when used. In embodiments of the present invention, fluids may be configured so as to provide for controlling the viscosity of the fluids according to different conditions encountered in oilfield applications.

In certain aspects, the invention relates to a process in which an oilfield fluid, which contains a polymer and a crosslinking agent which is able to combine with the polymer by using the Diels-Alder reaction, is pumped through a wellbore to a subterranean location where the crosslinking by means of the Diels-Alder reaction takes place when the fluid is exposed to the downhole conditions, thereby increasing the viscosity of the fluid.

In other aspects the invention relates to a converse process in which an oilfield fluid, which contains a crosslinked product of a polymer and a crosslinking agent combined with the polymer by Diels-Alder reaction, is pumped through a wellbore to a subterranean location where the crosslinking agent and the polymer are separated by retro-Diels-Alder reaction when the fluid is exposed to the downhole conditions, thereby breaking crosslinks and decreasing the viscosity of the fluid.

In both cases, either the polymer or the crosslinking agent may contain diene groups while the other of them contains dienophile groups. The processes may comprise an initial step of preparing the oilfield fluid before it is pumped down the wellbore, by mixing polymer and crosslinking agent or crosslinked polymer with a liquid.

In one aspect, embodiments of the present invention may relate to a compound of formula I:

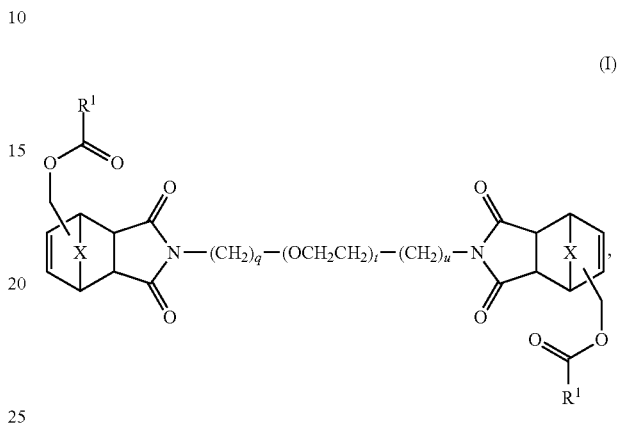

wherein: $R^1$ is alkyl, aryl, alkylaryl, an acrylate/acrylate copolymer, an acrylate/(meth)acrylate copolymer, or a (meth)acrylate/(meth)acrylate copolymer; X is $CH_2$, O, $S(O)_v$, or $NR^2$; v is an integer selected from 0 to 2; $R^2$ is hydrogen or alkyl; and q, t and u are each integers, each independently selected from 0 to 100.

In another aspect, embodiments of the present invention may relate to the compound of formula I, wherein $R^1$ is alkyl; and X is O. Further embodiments of the present invention may relate to the compound of formula I, wherein $R^1$ is an acrylate/acrylate copolymer; and X is O.

In another aspect embodiments of the present invention may relate to the compound of formula I, wherein the compound of formula I has formula II:

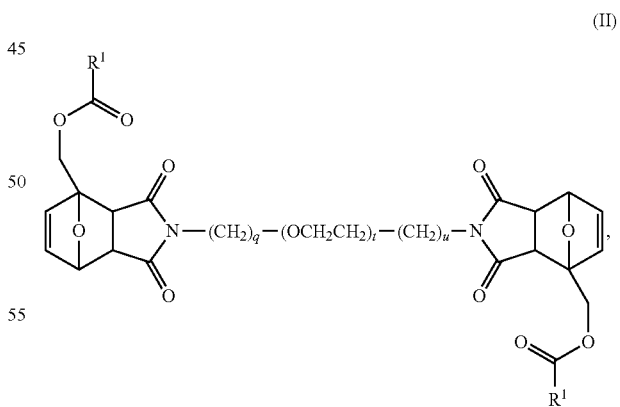

wherein $R^1$ is alkyl.

In another aspect, embodiments of the present invention may relate to the compound of formula II, wherein $R^1$ is —$CH(CH_3)_2$; q is 2; t is 2; and u is 0.

In yet a further aspect, embodiments of the present invention may relate to the compound of formula I, wherein the compound of formula I has formula III:

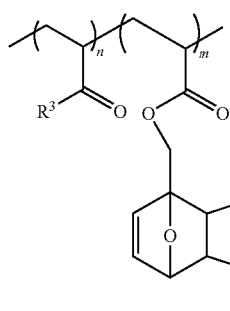

(III)

wherein R³ is —NH₂, —NHalkyl, —N(alkyl)₂, —OH, —Oalkyl; —Oaryl, alkyl, aryl or arylalkyl.

In another aspect embodiments of the present invention may relate to the compound of formula III, wherein R³ is —NH₂; q is 3; t is 35; and u is 1 or wherein R³ is —NH₂; q is 2; t is 2; and u is 0.

In yet another aspect, embodiments of the present invention may relate to the compound of formula IV:

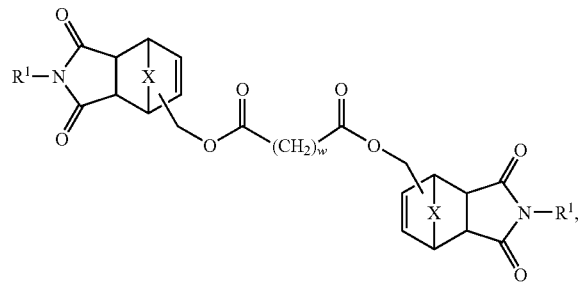

(IV)

wherein:
R¹ is alkyl, aryl, alkylaryl, an acrylate/acrylate copolymer, an acrylate/(meth)acrylate copolymer, or a (meth)acrylate/(meth)acrylate copolymer;
X is CH₂, O, S(O)$_v$ or NR²;
v is an integer selected from 0 to 2;
R² is hydrogen or alkyl; and
w is an integer selected from 1 to 100.

In a further aspect, embodiments of the present invention may relate to the compound of formula IV, wherein R¹ is alkyl; and X is O. Further embodiments of the present invention may relate to the compound of formula IV, wherein R¹ is an acrylate/acrylate copolymer; and X is O.

In another aspect, embodiments of the present invention may relate to the compound of formula IV, wherein the compound of formula IV has formula V:

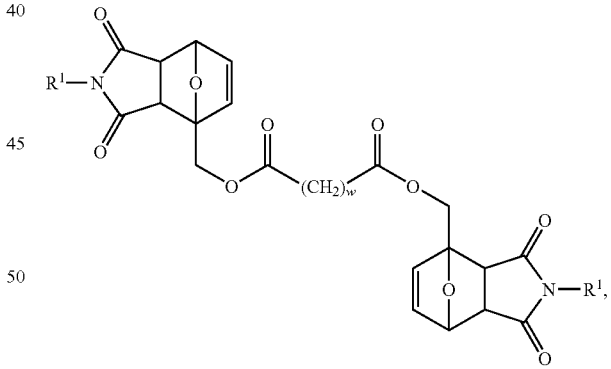

(V)

wherein R¹ is alkyl.

In another aspect, the invention may relate to the compound of formula V, wherein R¹ is —CH(CH₃)₂; and w is 4.

In another aspect, embodiments of the present invention may relate to the compound of formula IV, wherein the compound of formula IV has formula VI:

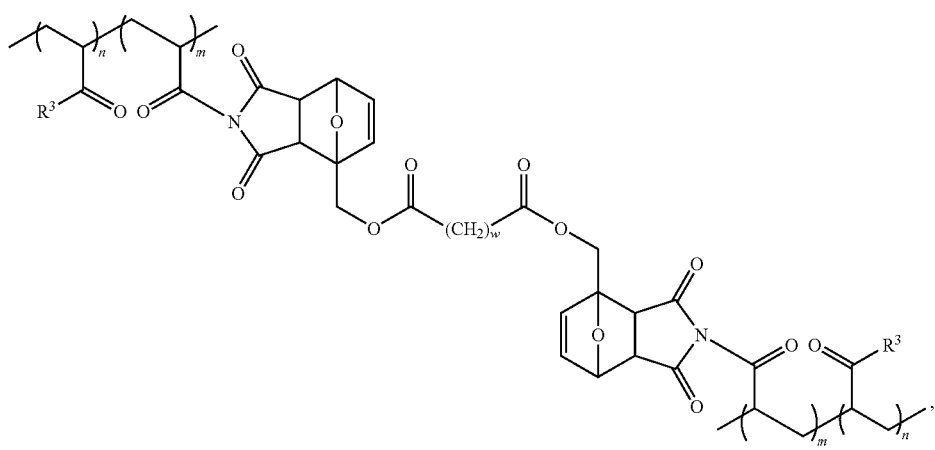

wherein R³ is —NH₂, —NHalkyl, —N(alkyl)₂, —OH, —Oalkyl; —Oaryl, alkyl, aryl or arylalkyl.

In another aspect, embodiments of the present invention may relate to the compound of formula VI, wherein R³ is —NH₂; and w is 4.

In another aspect, embodiments of the present invention may relate to the compound of formula VII:

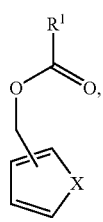

(VII)

wherein:
R¹ is alkyl, aryl, alkylaryl, an acrylate/acrylate copolymer, an acrylate/(meth)acrylate copolymer, or a (meth)acrylate/(meth)acrylate copolymer;
X is CH₂, O, S(O)$_v$ or NR²;
v is an integer selected from 0 to 2; and
R² is hydrogen or alkyl.

In another aspect, embodiments of the present invention may relate to the compound of formula VII, wherein R¹ is an acrylate/acrylate copolymer; and X is O.

In another aspect, embodiments of the present invention may relate to the compound of formula VII, wherein the compound of formula VII has formula VIII:

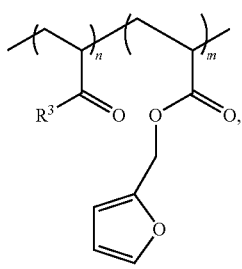

(VIII)

wherein R³ is —NH₂, —NHalkyl, —N(alkyl)₂, —OH, —Oalkyl; —Oaryl, alkyl, aryl or arylalkyl.

In another aspect, embodiments of the present invention may relate to the compound of formula VIII, wherein R³ is —NH₂.

In another aspect, embodiments of the present invention may relate to the compound of formula IX:

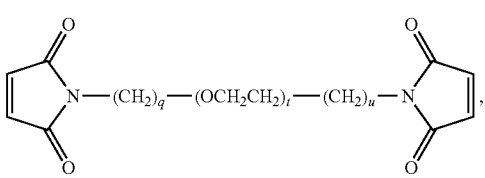

(IX)

wherein q, t and u are each integers, each independently selected from 0 to 100.

In another aspect, embodiments of the present invention may relate to the compound of formula IX, wherein q is 3; t is 35; and u is 1.

In another aspect, embodiments of the present invention may relate to the compound of formula IX, wherein q is 2; t is 2; and u is 0.

In another aspect, the invention relates to the compound of formula X:

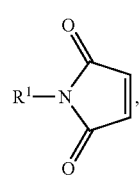

(X)

wherein R¹ is alkyl, aryl, alkylaryl, an acrylate/acrylate copolymer, an acrylate/(meth)acrylate copolymer, or a (meth)acrylate/(meth)acrylate copolymer.

In another aspect, embodiments of the present invention may relate to the compound of formula X, wherein R¹ is an acrylate/acrylate copolymer.

In another aspect, embodiments of the present invention may relate to the compound of formula X, wherein the compound of formula X has formula XI:

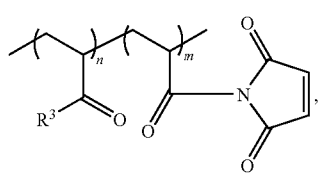
(XI)

wherein $R^3$ is —$NH_2$, —NHalkyl, —N(alkyl)$_2$, —OH, —Oalkyl; —Oaryl, alkyl, aryl or arylalkyl.

In another aspect, embodiments of the present invention may relate to the compound of formula XI, wherein $R^3$ is —$NH_2$.

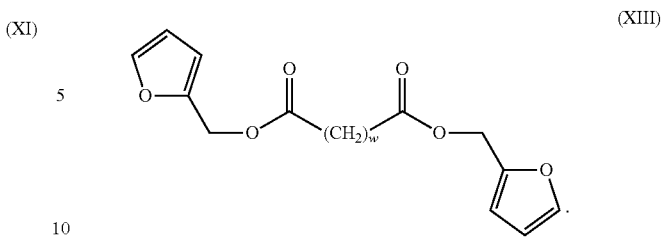
(XIII)

In another aspect, embodiments of the present invention may relate to methods for preparing the compound of formula I, by reacting the compound of formula VII with the compound of formula IX:

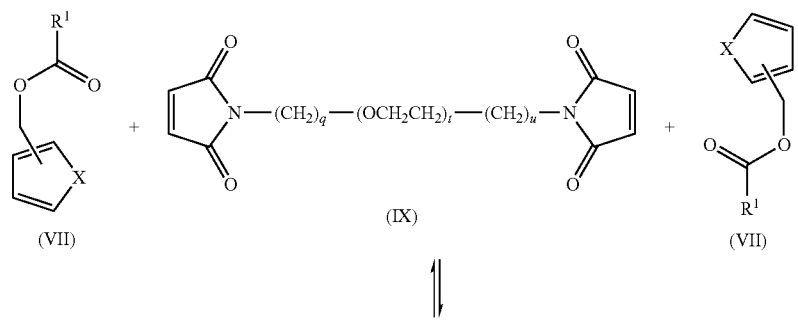

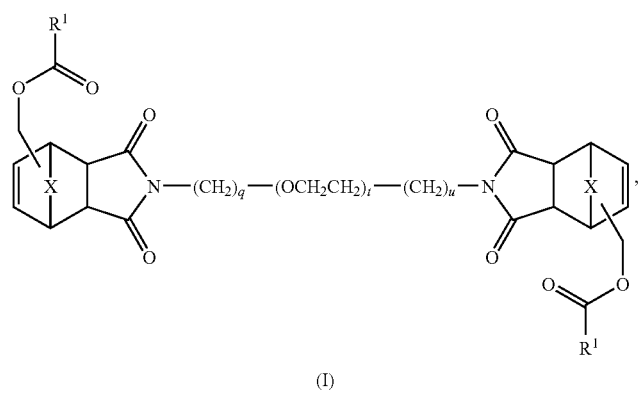
(I)

In another aspect, the invention relates to the compound of formula XII:

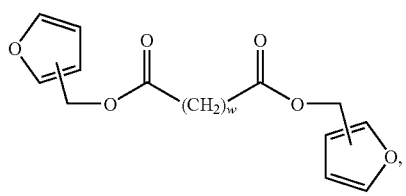
(XII)

wherein w is an integer selected from 1 to 100.

In another aspect, embodiments of the present invention may relate to the compound of formula XII, wherein the compound of formula XII has formula XIII:

wherein:
$R^1$ is alkyl, aryl, alkylaryl, an acrylate/acrylate copolymer, an acrylate/(meth)acrylate copolymer, or a (meth)acrylate/(meth)acrylate copolymer;
X is $CH_2$, O, $S(O)_v$ or $NR^2$; v is an integer selected from 0 to 2;
$R^2$ is hydrogen or alkyl; and q, t and u are each integers, each independently selected from 0 to 100.

In another aspect, embodiments of the present invention may relate to methods for preparing the compound of formula I by reacting the compound of formula VII with the compound of formula IX in the presence of solvent.

In another aspect, the invention relates to methods for preparing the compound of formula I, by reacting the compound of formula VII with the compound of formula IX in the presence of water.

In another aspect, the invention relates to the compound of formula I, prepared by the method of reacting the compound of formula VII with the compound of formula IX.

In another aspect, the invention relates to the compound of formula II, prepared by the method of reacting the compound of formula VII with the compound of formula IX.

In another aspect, the invention relates to the compound of formula III, prepared by the method of reacting the compound of formula VII with the compound of formula IX.

In another aspect, the invention relates to methods for preparing the compound of formula IV by reacting the compound of formula X with the compound of formula XII:

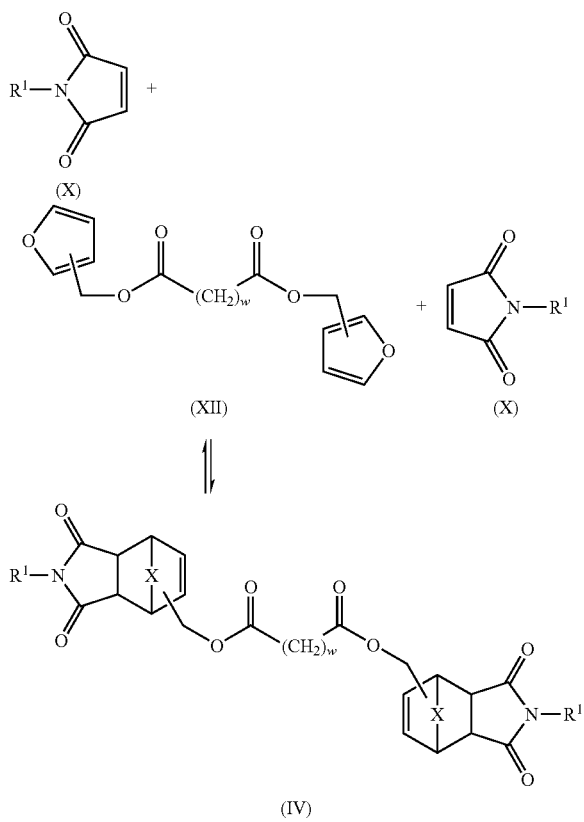

wherein:
$R^1$ is alkyl, aryl, alkylaryl, an acrylate/acrylate copolymer, an acrylate/(meth)acrylate copolymer, or a (meth)acrylate/(meth)acrylate copolymer;
X is $CH_2$, O, $S(O)_v$ or $NR^2$; v is an integer selected from 0 to 2;
$R^2$ is hydrogen or alkyl; and w is an integer selected from 1 to 100.

In another aspect, the invention relates to methods for preparing the compound of formula IV by reacting the compound of formula X with the compound of formula XII in the presence of solvent.

In another aspect, the invention relates to methods for preparing the compound of formula IV by reacting the compound of formula X with the compound of formula XII in the presence of water.

In another aspect, the invention relates to the compound of formula IX, prepared by the method of reacting the compound of formula X with the compound of formula XII.

In another aspect, the invention relates to the compound of formula V, prepared by the method of reacting the compound of formula X with the compound of formula XII.

In another aspect, the invention relates to the compound of formula VI, prepared by the method of reacting the compound of formula X with the compound of formula XII.

In another aspect, the invention relates to methods for preparing the compound of formula VIII by reacting furfuryl acrylate with the compound of formula XIII:

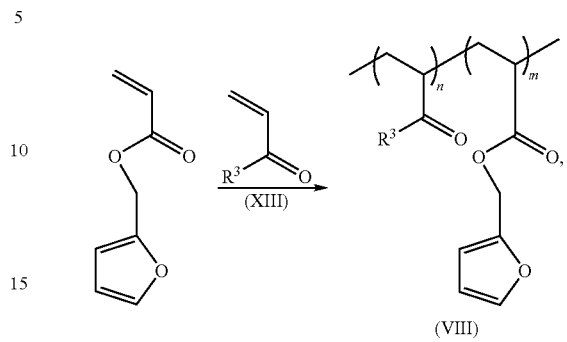

in the presence of a radical initiator and solvent, wherein $R^3$ is —$NH_2$, —NHalkyl, —N(alkyl)$_2$, —OH, —Oalkyl; —Oaryl, alkyl, aryl or arylalkyl.

In another aspect, the invention relates to methods for preparing the compound of formula VIII by reacting furfuryl acrylate with the compound of formula XIII, wherein the radical initiator is AIBN; the solvent is an alcohol or is water; and $R^3$ is —$NH_2$.

In another aspect, the invention relates to methods for preparing the compound of formula VIII by reacting furfuryl acrylate with the compound of formula XIII by heating the reaction to about 70° C.

In another aspect, the invention relates to methods for preparing the compound of formula IX by reacting the compound of formula XIV with maleic anhydride:

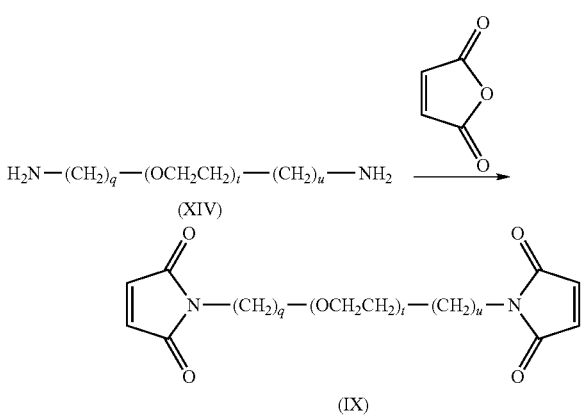

in the presence of a base, catalyst, acetic anhydride and solvent.

In another aspect, the invention relates to methods for preparing the compound of formula IX by reacting the compound of formula XIV with maleic anhydride in the presence of a base, catalyst, acetic anhydride and solvent, wherein the base is triethylamine, the catalyst is nickel acetate, and the solvent is N,N-dimethylformamide.

In another aspect, the invention relates to methods for preparing the compound of formula IX by reacting the compound of formula XIV with maleic anhydride in the presence of a base, catalyst, acetic anhydride and solvent, and heating the reaction to about 80° C.

In another aspect, the invention relates to methods for preparing the compound of formula XI by reacting 1-(acryloyl-1H-pyrrole-2,5-dione) with the compound of formula XIII:

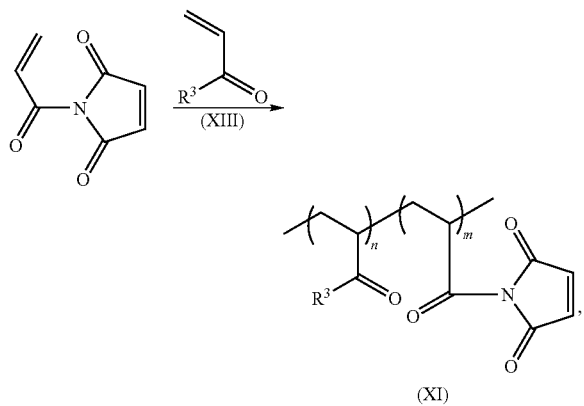

in the presence of a radical initiator and solvent, wherein R³ is —NH₂, —NHalkyl, —N(alkyl)₂, —OH, —Oalkyl; —Oaryl, alkyl, aryl or arylalkyl.

In another aspect, the invention relates to methods for preparing the compound of formula XI by reacting 1-(acryloyl-1H-pyrrole-2,5-dione) with the compound of formula XIII, in the presence of a radical initiator and solvent, wherein the radical initiator is AIBN.

In another aspect, the invention relates to methods for preparing the compound of formula XI by reacting 1-(acryloyl-1H-pyrrole-2,5-dione) with the compound of formula XIII, in the presence of a radical initiator and solvent, and heating the reaction to about 80° C.

In another aspect, the invention relates to methods for preparing the compound of formula XII by reacting the compound of formula XVI with the compound of formula XV:

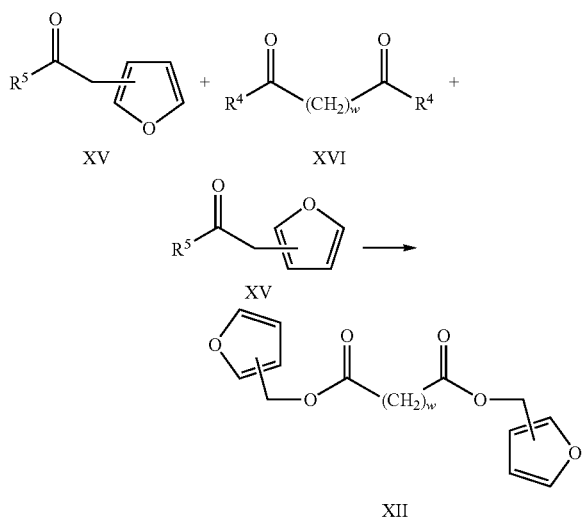

wherein R⁴ is halogen; and R⁵ is OH.

In another aspect, the invention relates to reversible polymeric gelations having the compound of formula I.

In another aspect, the invention relates to methods for reversibly changing the viscosity of fluids by adding the compound of formula I to the fluid.

In another aspect, the invention relates to methods for reversibly changing the viscosity of fluids by adding the compound of formula VII with the compound of formula IX to the fluid.

In another aspect, the invention relates to methods for reversibly changing the viscosity of fluids by adding the compound of formula IX to the fluid.

In another aspect, the invention relates to methods for reversibly changing the viscosity of fluids by adding the compound of formula X with the compound of formula XII to the fluid.

In another aspect, the invention relates to methods for reversibly changing the viscosity of fluids by adding the compound of formula I to the fluid, wherein the fluid is an oilfield fluid.

In another aspect, the invention relates to methods for reversibly changing the viscosity of oil-field fluids by adding the compound of formula I to the fluid, wherein the oil-field fluid is a fracturing fluid, drilling fluid, diverting fluid or gravel packing fluid.

In one embodiment of the present invention, a recycling drilling fluid may comprise synthesized copolymers which may undergo the Diels-Alder reaction. In such an embodiment, the drilling fluid may comprise a gel when used in a wellbore until the drilling fluid reaches a surface location where it may be heated and degelled by a retro-Diels-Alder reaction and solid components may be recovered.

In another embodiment of the present invention, a scale inhibitor fluid may comprise synthesized copolymers which may undergo the Diels-Alder reaction. The scale inhibitor fluid may be configured to provide that under certain downhole conditions the scale inhibitor will undergo a retro-Diels-Alder reaction and become degelled and release the scale inhibito components. As such, the copolymers provide for a delivery system for, among other things, scale inhibitors, that may deliver components of a gelled fluid when certain conditions are encountered.

In one embodiment of the present invention, a hydraulic fracturing fluid may comprise synthesized copolymers which may undergo the Diels-Alder reaction. The hydraulic fracturing fluid may be delivered as a gel to provide for fracturing of a subterranean formation after delivery through a wellbore. The copolymers, in accordance with an embodiment of the present invention, may be configured to provide for undergoing a retro-Diels-Alder reaction under conditions that may exist or may be created after the fracturing process, whereby the fracturing fluid may be degelled and, as a result, may easily be removed/cleaned up.

The foregoing, are just a couple of examples of oilfield applications of fluids that in accordance with an embodiment of the present invention may be gelled or degelled by the Diels-Alder reaction. Controlling of the viscosity of an oilfield fluid provides for many applications for delivery of fluid components, controlled intervention into subterranean/wellbore sections and/or the like.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

DETAILED DESCRIPTION OF THE INVENTION

Figure 1:
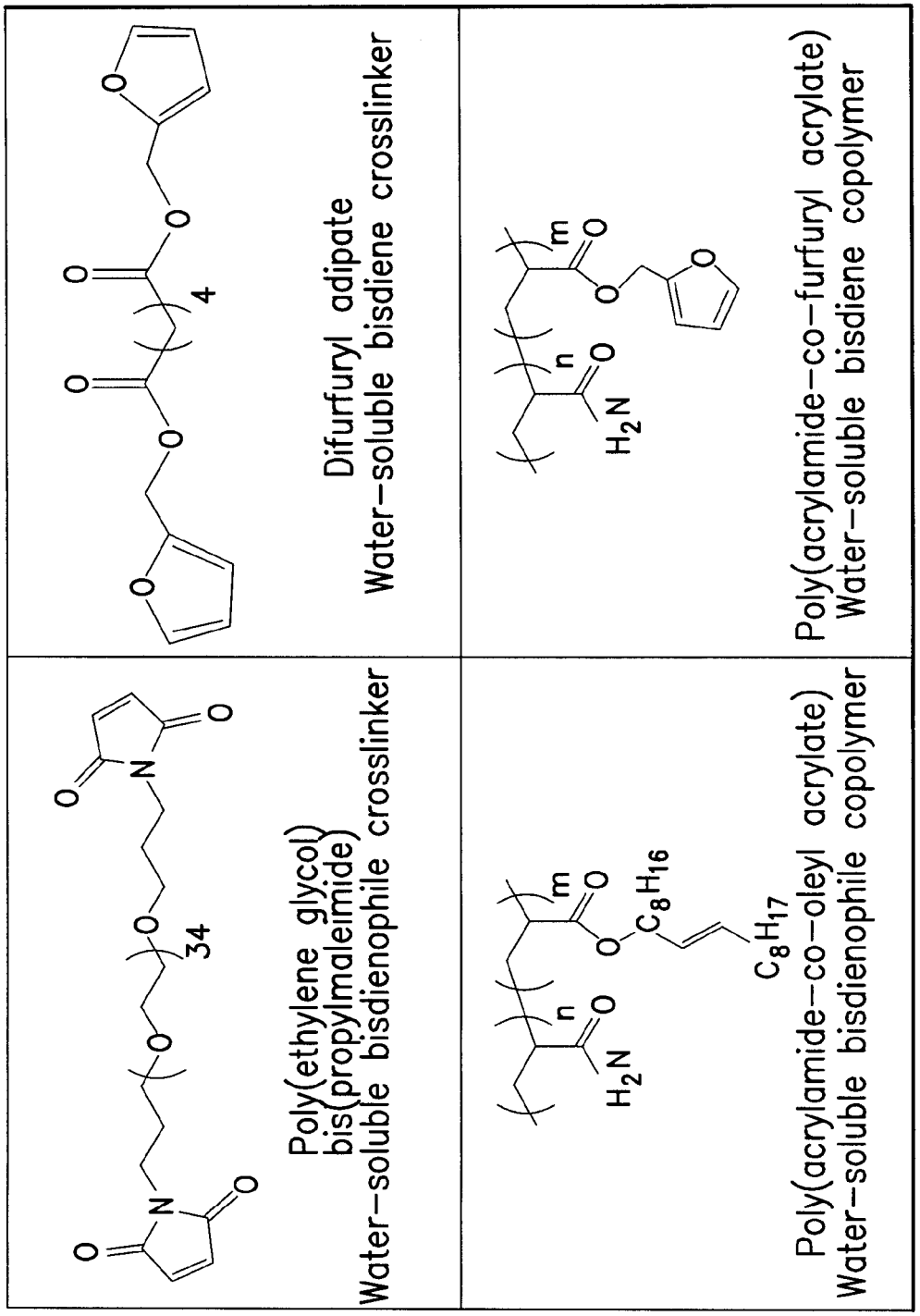
FIG. 1 shows representative examples of water-soluble copolymers or crosslinkers having diene and/or dienophile molecules which can undergo reversible Diels-Alder reactions.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Definitions. Abbreviations used herein have their conventional meaning within the chemical and biological arts. Where substituent groups are specified by their conventional chemical formulae, written from left to right, they equally encompass the chemically identical substituents that would result from writing the structure from right to left, e.g., —CH$_2$O— is equivalent to —OCH$_2$—; —C(O)O— is equivalent to —OC(O)—; and —C(O)NR— is equivalent to —NRC(O)—, and the like.

The term "alkyl," by itself or as part of another substituent, means, unless otherwise stated, a straight (i.e. unbranched) or branched chain, or cyclic hydrocarbon radical, or combination thereof, which may be fully saturated, mono- or polyunsaturated and can include di- and multivalent radicals, having the number of carbon atoms designated (i.e., $C_1$-$C_{10}$ means one to ten carbons, $C_1$-$C_6$ means one to 6 carbons, etc.). Examples of saturated hydrocarbon radicals include, but are not limited to, groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. Alkyl groups which are limited to hydrocarbon groups are termed "homoalkyl".

The term "alkylene" by itself or as part of another substituent means a divalent radical derived from an alkyl, as exemplified, but not limited, by —CH$_2$CH$_2$CH$_2$CH$_2$—. Typically, an alkyl (or alkylene) group will have from 1 to 24 carbon atoms, with those groups having 10 or fewer carbon atoms being preferred in the present invention. A "lower alkyl" or "lower alkylene" is a shorter chain alkyl or alkylene group, generally having eight or fewer carbon atoms.

The term "heteroalkyl," by itself or in combination with another term, means, unless otherwise stated, a stable straight or branched chain, or cyclic hydrocarbon radical, or combinations thereof, consisting of at least one carbon atoms and at least one heteroatom selected from the group consisting of O, N, P, Si and S, and wherein nitrogen and sulfur atoms may optionally be oxidized and the nitrogen heteroatom may optionally be quaternized. The heteroatom(s) O, N, P and S and Si may be placed at any interior position of the heteroalkyl group or at the position at which alkyl group is attached to the remainder of the molecule. Included within the definition of heteroalkyl compounds are alkoxy, thioalkoxy, aminoalkyl, aminodialkyl and the like. Other examples include, but are not limited to, —O—CH$_2$—CH$_3$, —CH$_2$—CH$_2$—O—CH$_3$, —CH$_2$—CH$_2$—NH—CH$_3$, —CH$_2$—CH$_2$—N(CH$_3$)—CH$_3$, —CH$_2$—S—CH$_2$—CH$_3$, —CH$_2$—CH$_2$, —S(O)—CH$_3$, —CH$_2$—CH$_2$—S(O)$_2$—CH$_3$, —CH=CH—O—CH$_3$, —Si(CH$_3$)$_3$, —CH$_2$—CH=N—OCH$_3$, —CH=CH—N(CH$_3$)—CH$_3$, O—CH$_3$, —O—CH$_2$—CH$_3$, and —CN. Up to two heteroatoms may be consecutive, such as, for example, —CH$_2$—NH—OCH$_3$ and —CH$_2$—O—Si(CH$_3$)$_3$. Similarly, the term "heteroalkylene" by itself or as part of another substituent means a divalent radical derived from heteroalkyl, as exemplified, but not limited by, —CH$_2$—CH$_2$—S—CH$_2$—CH$_2$— and —CH$_2$—S—CH$_2$—CH$_2$—NH—CH$_2$—. For heteroalkylene groups, heteroatoms can also occupy either or both of the chain termini (e.g., alkyleneoxo, alkylenedioxo, alkyleneamino, alkylenediamino, and the like). Still further, for alkylene and heteroalkylene linking groups, no orientation of the linking group is implied by the direction in which the formula of the linking group is written. For example, the formula —C(O)OR'— represents both —C(O)OR'— and —R'OC(O)—. As described above, heteroalkyl groups, as used herein, include those groups that are attached to the remainder of the molecule through a heteroatom, such as —C(O)R', —C(O)NR', —NR'R$^{41}$, —OR', —SR', and/or —SO$_2$R'. Where "heteroalkyl" is recited, followed by recitations of specific heteroalkyl groups, such as —NR'R" or the like, it will be understood that the terms heteroalkyl and —NR'R" are not redundant or mutually exclusive. Rather, the specific heteroalkyl groups are recited to add clarity. Thus, the term "heteroalkyl" should not be interpreted herein as excluding specific heteroalkyl groups, such as —NR'R" or the like.

The terms "cycloalkyl" and "heterocycloalkyl", by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridinyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like. The terms "cycloalkylene" and "heterocycloalkylene" refer to the divalent derivatives of cycloalkyl and heterocycloalkyl, respectively.

The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo($C_1$-$C_4$)alkyl" is mean to include, but not be limited to, trifluoromethyl, 2,2,2-trifluoroethyl, 4-chlorobutyl, 3-bromopropyl, and the like.

The term "aryl" means, unless otherwise stated, a polyunsaturated, aromatic, hydrocarbon substituent which can be a single ring or multiple rings (preferably from 1 to 3 rings) which are fused together or linked covalently.

The term "heteroaryl" refers to, unless otherwise stated, aryl groups (or rings) that contain from one to four heteroatoms selected from N, O, and S, wherein nitrogen and sulfur atoms are optionally oxidized, and the nitrogen atom(s) are optionally quaternized. A heteroaryl group can be attached to the remainder of the molecule through a carbon or heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridinyl, 3-pyridinyl, 4-pyridinyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5 quinoxalinyl, 3-quinolyl, and 6-quinolyl. Substituents for each of above noted aryl and heteroaryl ring systems are selected from the group of acceptable substituents described below. The terms "arylene" and "heteroarylene" refer to the divalent derivatives of aryl and heteroaryl, respectively.

For brevity, the term "aryl" when used in combination with other terms (e.g., aryloxo, arylthioxo, arylalkyl) includes both aryl and heteroaryl rings as defined above. Thus, the term "arylalkyl" is meant to include those radicals in which an aryl group is attached to an alkyl group (e.g., benzyl, phenethyl, pyridinylmethyl and the like) including those alkyl groups in which a carbon atom (e.g., a methylene group) has been replaced by, for example, an oxygen atom (e.g., phenoxymethyl, 2-pyridinyloxymethyl, 3-(1-naphthyloxy)propyl, and the like). Similarly, the term "heteroarylalkyl" is meant to include those radicals in which a heteroaryl group is attached to an alkyl group (e.g., pyridinylmethyl, quinolinylmethyl, 1,2,4-triazolyl[4,3-b]pyridazinylmethyl, 1H-benzotriazolyl-methyl, benzothiazolylmethyl, and the like. However, the term "haloaryl," as used herein is meant to cover only aryls substituted with one or more halogens.

As used herein, the term "alkylaryl" means, unless otherwise stated, combinations of alkyl and aryl groups. For example, benzyl, toluene, phenethyl and tert-butylphenyl are some non-limiting examples of "alkylaryl" groups. Such groups may be connected to the remaining part of the molecule either through the alkyl or the aryl portion.

The term "oxo" as used herein means an oxygen that is double bonded to a carbon atom.

Each of above terms (e.g., "alkyl," "heteroalkyl," "cycloalkyl, and "heterocycloalkyl", "aryl," "heteroaryl" as well as their divalent radical derivatives) are meant to include both substituted and unsubstituted forms of the indicated radical. Preferred substituents for each type of radical are provided below.

Substituents for alkyl, heteroalkyl, cycloalkyl, heterocycloalkyl monovalent and divalent derivative radicals (including those groups often referred to as alkylene, alkenyl, heteroalkylene, heteroalkenyl, alkynyl, cycloalkyl, heterocycloalkyl, cycloalkenyl, and heterocycloalkenyl) can be one or more of a variety of groups selected from, but not limited to: —OR', =O, =NR', =N—OR', —NR'R", —SR', -halogen, —SiR'R"R''', —OC(O)R', —C(O)R', —CO$_2$R', —C(O)NR'R", —OC(O)NR'R", —NR"C(O)R', —NR'—C(O)NR"R''', —NR"C(O)OR', —NR—C(NR'R"R''')=NR'''', —S(O)R', —S(O)$_2$R', —S(O)$_2$NR'R", —NRSO$_2$R', —CN and —NO$_2$ in a number ranging from zero to (2m'+1), where m' is the total number of carbon atoms in such radical. R', R", R''' and R'''' each preferably independently refer to hydrogen, substituted or unsubstituted heteroalkyl, substituted or unsubstituted cycloalkyl, substituted or unsubstituted heterocycloalkyl, substituted or unsubstituted aryl (e.g., aryl substituted with 1-3 halogens), substituted or unsubstituted alkyl, alkoxy or thioalkoxy groups, or arylalkyl groups. When a compound of the invention includes more than one R group, for example, each of the R groups is independently selected as are each R', R", R''' and R'''' groups when more than one of these groups is present. When R' and R" are attached to the same nitrogen atom, they can be combined with the nitrogen atom to form 4-, 5-, 6-, or 7-membered ring. For example, —NR'R" is meant to include, but not be limited to, 1-pyrrolidinyl and 4-morpholinyl. From above discussion of substituents, one of skill in art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O) CH$_3$, —C(O)CF$_3$, —C(O)CH$_2$OCH$_3$, and the like).

Similar to the substituents described for alkyl radicals above, exemplary substituents for aryl and heteroaryl groups (as well as their divalent derivatives) are varied and are selected from, for example: halogen, —OR', —NR'R", —SR', -halogen, —SiR'R"R''', —OC(O)R', —C(O)R', —CO$_2$R', —C(O)NR'R", —OC(O)NR'R", —NR"C(O)R', —NR'—C(O)NR"R''', —NR"C(O)OR', —NR—C(NR'R"R''')=NR'''', —NR—C(NR'R")=NR''', —S(O)R', —S(O)$_2$R', —S(O)$_2$NR'R", —NRSO$_2$R', —CN and —NO$_2$, —R', —N$_3$, —CH(Ph)$_2$, fluoro(C$_1$-C$_4$)alkoxo, and fluoro (C$_1$-C$_4$)alkyl, in a number ranging from zero to the total number of open valences on aromatic ring system; and where R', R", R''' and R'''' are preferably independently selected from hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl and substituted or unsubstituted heteroaryl. When a compound of the invention includes more than one R group, for example, each of the R groups is independently selected as are each R', R", R''' and R'''' groups when more than one of these groups is present.

As used herein, the term "heteroatom" or "ring heteroatom" is meant to include oxygen (O), nitrogen (N), sulfur (S), phosphorus (P), and silicon (Si).

Certain compounds of the present invention can exist in unsolvated forms as well as solvated forms, including hydrated forms. In general, the solvated forms are equivalent to unsolvated forms and are encompassed within the scope of the present invention. Certain compounds of the present invention may exist in multiple crystalline or amorphous forms. In general, all physical forms are equivalent for the uses contemplated by the present invention and are intended to be within the scope of the present invention.

Certain compounds of the present invention possess asymmetric carbon atoms (optical centers) or double bonds; the enantiomers, racemates, diastereomers, tautomers, geometric isomers, stereoisometric forms that may be defined, in terms of absolute stereochemistry, as (R)- or (S)- or, as (D)- or (L)- for amino acids, and individual isomers are encompassed within the scope of the present invention. The compounds of the present invention do not include those which are known in art to be too unstable to synthesize and/or isolate. The present invention is meant to include compounds in racemic and optically pure forms. Optically active (R)- and (S)-, or (D)- and (L)-isomers may be prepared using chiral synthons or chiral reagents, or resolved using conventional techniques. When the compounds described herein contain olefinic bonds or other centers of geometric asymmetry, and unless specified otherwise, it is intended that the compounds include both E and Z geometric isomers.

The term "tautomer," as used herein, refers to one of two or more structural isomers which exist in equilibrium and which are readily converted from one isomeric form to another.

It will be apparent to one skilled in the art that certain compounds of this invention may exist in tautomeric forms, all such tautomeric forms of the compounds being within the scope of the invention.

Unless otherwise stated, structures depicted herein are also meant to include all stereochemical forms of the structure; i.e., the R and S configurations for each asymmetric center. Therefore, single stereochemical isomers as well as enantiomeric and diastereomeric mixtures of the present compounds are within the scope of the invention.

The terms "a," "an," or "a(n)", when used in reference to a group of substituents herein, mean at least one. For example, where a compound is substituted with "an" alkyl or aryl, the compound is optionally substituted with at least one alkyl and/or at least one aryl. Moreover, where a moiety is substituted with an R substituent, the group may be referred to as "R-substituted." Where a moiety is R-substituted, the moiety is substituted with at least one R substituent and each R substituent is optionally different.

As used herein, the term "acrylate/acrylate copolymer" refers to polymers of acrylate derivatives. For example, the following reaction of an acrylate compound I with another acrylate compound II, produces the "acrylate/acrylate copolymer" III:

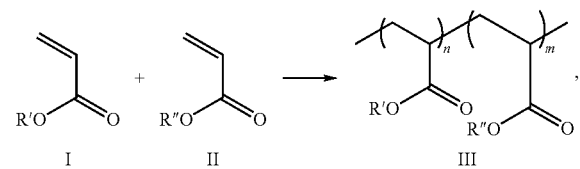

wherein m and n are each independently integers which represent the repeating units of the polymer.

As used herein, the term "acrylate/(meth)acrylate copolymer" refers to polymers of acrylate and (meth)acrylate derivatives. For example, the following reaction of an acrylate compound IV with a (meth)acrylate compound V, produces the "acrylate/(meth)acrylate copolymer" VI:

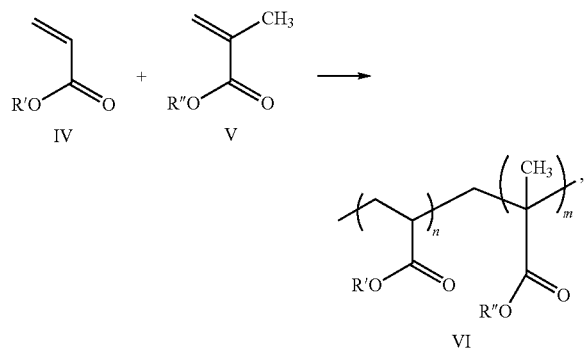

wherein m and n are each independently integers which represent the repeating units of the polymer.

As used herein, the term "(meth)acrylate/(meth)acrylate copolymer" refers to polymers of (meth)acrylate and (meth)acrylate derivatives. For example, the following reaction of a (meth)acrylate compound X with a (meth)acrylate compound XI, produces the "(meth)acrylate/(meth)acrylate copolymer" XII:

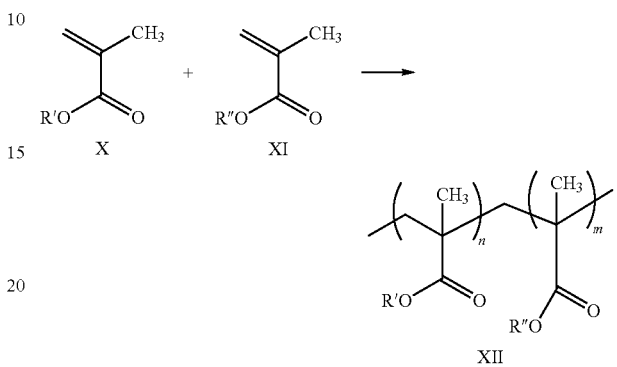

wherein m and n are each independently integers which represent the repeating units of the polymer.

Description of compounds of the present invention are limited by principles of chemical bonding known to those skilled in the art. Accordingly, where a group may be substituted by one or more of a number of substituents, such substitutions are selected so as to comply with principles of chemical bonding and to give compounds which are not inherently unstable and/or would be known to one of ordinary skill in the art as likely to be unstable under ambient conditions, such as aqueous, neutral, physiological conditions.

The symbol ⁓ denotes the point of attachment of a moiety to the remainder of the molecule.

The Synthesis and Use of the Compounds in Oilfield Applications

This invention details the synthesis and use in oilfield/hydrocarbon applications, of copolymers which can undergo the Diels-Alder reaction to form a gel. Under appropriate conditions, the retro Diels-Alder reaction can then take place, decreasing the viscosity of the aforementioned gel. The temperatures of the forward and reverse Diels-Alder reaction can be tuned by various methods, including adding electron donating groups to the diene, or electron withdrawing groups to the dienophile, use of catalysts, steric effects at the crosslinking site and allowing consumption of the diene and dienophile to facilitate the retro reaction. Representative examples of water-soluble copolymers or crosslinkers having diene and/or dienophile molecules which can undergo reversible Diels-Alder reactions are shown in FIG. 1.

Polymers that can be reversibly cross-linked can find possible applications in many areas of oilfield chemistry. For example, fracturing fluids, drilling fluids, diverting fluids, gravel packing fluids, fluid loss control pills, etc. all require gelled fluids that can, under certain conditions, decrease in viscosity. One application is as a recyclable drilling fluid, where the Diels-Alder cross-linked gel is designed so that its temperature to de-gel is greater than the reservoir temperature. This fluid could be raised up to the surface and then heated to a temperature where the retro Diels-Alder reaction would take place, and its viscosity would decrease back to that of the starting materials. This would enable the recovery of the valuable solid components, such as the weighing agent(s).

Embodiments of the present invention provide an efficient material for providing emulsion stability and filtration control to invert emulsions and other oil or synthetic based drilling fluids. This material comprises of a blend of a carboxylic acid terminated polyamide, and a mixture produced by the Diels-Alder reaction of carboxylic acid, poly carboxylic acid or anhydride dienophiles with a mixture of fatty acids and resin acids. Improved emulsion forming capabilities with only one third of the concentration was reported, along with improved electrical stability even after heat stress. Significantly better filtration control than conventional emulsifiers were observed and no fluid loss control additives were needed for the same filtration properties as prior art emulsifiers.

A second possible application is in the controlled delivery of a useful component i.e. a pH modifier, a corrosion/scale/asphaltene/paraffin inhibitor, a demulsifier, a surfactant. If the compounds were designed to not only incorporate the diene or dienophile functionality, but also the useful component (either as one of the two compounds, or a separate molecule held by the viscosity of the fluid), the gelled fluid could, over a certain temperature range, be degelled by the retro Diels-Alder reaction, to release the functional component. Furthermore, long term downhole chemistry deployment may be envisaged if the Diels-Alder fluid comprised of multiple components which had different retro-Diels-Alder temperatures/times, so the useful component may be released over time.

Veazey et al. report a corrosion inhibiting adduct prepared by the Diels-Alder reaction of 2,3 poly(alloocimene) and 6,7 poly(alloocimene) with an activated olefin with or without the use of a catalyst (Veazey, R. L.; Bardasz, E. A. "Corrosion Inhibitors", Union Camp Corporation, Aug. 7, 1990, U.S. Pat. No. 4,946,626). This adduct, along with a further material comprising of the same adduct reacted with a polyamine to form amide bonds, showed corrosion inhibiting properties. Another corrosion inhibitor has been reported (Fischer, E. R.; Alford, J. A.; Boyd, G. "Acid-anhydride esters as oil field corrosion inhibitors", Westvaco Corporation, Mar. 8, 1994, U.S. Pat. No. 5,292,480) which is produced by first reacting C18 unsaturated fatty acids with maleic anhydride or fumaric acid to produce the fatty acid Diels-Alder adduct. They then reacted this further in a condensation or hydrolysation reaction with a polyalcohol to form an acid-anhydride ester corrosion inhibitor. It was reported that these materials greatly outperformed the standard quaternary corrosion inhibitors.

Another application of the present invention is hydraulic fracturing, in such uses, the chemistry of the embodiment of the present invention may be optimized to deliver the appropriate gelation and degelation reactions as the fracturing fluid is heated from surface conditions to propped fracture conditions to flowback conditions. In aspects of the present invention, the forward Diels-Alder reaction may be configured to rapidly occur as the fluid reached a critical temperature, close to the temperature of the fluid as it enters the perforations. The gel may be stable during the fracture initiation/propagation phase (1-5 hours). The retro Diels-Alder reaction would occur when the fluid reached a second critical temperature, which is close to the reservoir temperature. If the reservoir temperature is lower than the retro Diels-Alder reaction an external temperature trigger such as an acid/base reaction or a metal hydride may be used. In this case the retro Diels-Alder reaction would occur only during the flowback phase. For a tip screen out fracture application however, where the viscosity of the fluid is reduced at the tip in order to increase the width of the fracture, the temperature of the retro Diels-Alder reaction may be almost the same as the reservoir temperature. Merely by way of example, advantages of using this chemistry over existing systems is that the degradation is controlled and the products formed from the degradation are all soluble, so no formation damage would occur. Furthermore, as the polymer itself is not broken in anyway, it may be recycled and reused.

The use of Diels-Alder chemistry has also been reported as a thermally removable adhesive (Aubert, J. H. "Method of making thermally removable adhesives", Sandia Corporation, Jun. 26, 2003, U.S. Pat. No. 6,825,315 B2). The patent described the high temperature mixing of a bismaleimide compound with a monomeric furan compound having an oxirane group, to form a homogeneous solution. On cooling this solution to a temperature less than approximately 70° C., the Diels-Alder reaction would be initiated and the thermally removable adhesive would be formed. Thermally remendable cross-linked polymeric materials that can be repeatedly mended or repaired by simple thermal treatment have also been reported (Wudl, F.; Chen, X. "Thermally Re-mendable Cross-linked Polymers", The Regents of the University of California, Aug. 23, 2005, U.S. Pat. No. 6,933,361). Embodiments of the present invention may provide a pre-polymer mixture that contains furan monomers having at least three furan moieties mixed with maleimide monomers that have at least three maleimide moieties. The pre-polymer mixture can be thermally cured via the Diels-Alder reaction to form highly cross linked polymeric materials. Along with the polymeric materials, embodiments of the present invention provide methods for heat treating the materials to provide for repairing fractures and joining polymeric bodies together using thermal welding techniques. Many oilfield applications are provided by embodiments of the present invention comprising a thermally responsive material, such as a thermally reversible glue for use in a patch, sandbridge, wiper plug or fluid loss pill; a temporary plastic coating; a fluid that releases an adhesive to stop paraffins sticking.

Another application of the present invention is as a proppant. For example, as a tacky/resin coated proppant, where controlling the "tackiness" on the surface of the particle is a key issue; here to be effective, the particles need to be non-tacky at room temperature (and for practical purposes up to 50-60° C. in order to facilitate a reasonable shelf life under field storage conditions), and then they should develop tack in a controlled fashion. If the particles become too tacky too quickly, then they could glue together and form a mass that cannot be pumped. If they form tack too slowly, then they will not prevent proppant flowback when the well is turned around. The retro Diels-Alder reaction according to embodiments of the present invention may be used to control the tackiness of the materials. Another area in proppant technology where the Diels-Alder reaction of the present invention may be useful is in pillar acid fracturing, where columns of proppant are required. Selective, heterogeneous breaking of the fluid could be obtained via the retro Diels-Alder chemistry leaving columns of proppant in the fracture.

Other applications for the materials of the present invention may include: using the reversibility of the Diels-Alder to produce reversibly wetted particles that start out oil wet (to facilitate use with oil phase muds), but can be converted, in accordance with aspects of the present invention, to water-wet for clean up.

In some embodiments, the Diels-Alder fluid may be configured to have a low crosslink temperature and may be used in an application where cold water was first pumped downhole where it would naturally go into the more porous, water saturated zones, then when the Diels-Alder fluid was pumped, it would only gel in these colder, porous zones, leaving the other, hotter, oil saturated zones free from polymeric gel. Production from, or treatment to, these oil saturated zones could then be carried out selectively.

As delayed polymer treatments for water control, where a Diels-Alder fluid was pumped downhole at a temperature above that required for the retro Diels-Alder reaction to occur. On cooling to reservoir temperature, this polymeric fluid would then gel.

If the retro Diels-Alder temperature was tuned to the bottom hole temperature, a gelled fluid could be pumped and it would only break its viscosity at the bottom of the well where the retro Diels-Alder reaction would take place.

If the retro Diels-Alder temperature was very high, this fluid could be used as an impermeable filter cake/membrane which could be kept cool by mud circulation.

The Diels-Alder reversible crosslink in accordance with an embodiment of the present invention may be used for fluids in steam flooding and thermal applications, for example, as fluids/materials to be used for diverting steam from thief zones. In certain aspects, the (co)polymer may contain a relatively thermally stable C—C backbone, and may be used for temporary or reversible treatments.

EXAMPLES

Examples of a water-soluble copolymer with pendant diene groups which can undergo reversible Diels-Alder reactions with a bisdienophile crosslinker is reported.

Example 1

Synthesis of Furfuryl Acrylate

Scheme 1: Reaction scheme for the synthesis of Furfuryl Acrylate

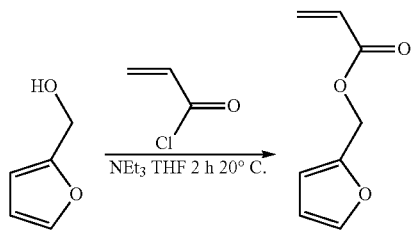

Furfuryl alcohol (5.3 mL, 1 eq.) was dissolved in THF (100 mL) in a dry, round bottomed flask and stirred with triethylamine (10.7 mL, 1.25 eq.). The solution was cooled to 0° C. and acryloyl chloride (5 mL, 1 eq.) was added dropwise. The mixture was stirred for 3 h at 20° C. The reaction was worked up by diluting with dichloromethane (50 mL) and filtered through a celite plug to remove the triethylammonium chloride, and the solvent was removed under vacuum. The residue was purified by silica column chromatography using tert-butylmethyl ether-hexane (1:7) (furfuryl acrylate $R_f$ 0.51) to give an oil (7.9 g 84.5% yield). IR (cm$^{-1}$): 1728 (C=O st), 3147, 3124 (=C—H st), 810, 748 (C—H δ, furan ring). $^1$H NMR (CDCl$_3$, 300 MHz): δ 6.39 (dd, 1H, H-1A, $J_{1A,1B}$=17.3 Hz, $J_{1A,2}$=1.47 Hz), 6.10 (dd, 1H, H-1B $J_{1B,2}$=10.41 Hz), 5.79 (dd, 1H, H-2), 5.10 (s, 2H, CH$_2$) ppm. Furan ring: 6.40 (bd, 1H, H-3', $J_{3',4'}$=3.2 Hz), 6.33 (dd, 1H, H-4', $J_{4',5'}$=1.9 Hz), 7.39 (m, 1H, H-5') ppm. $^{13}$C NMR (CDCl$_3$, 75 MHz): δ 131.1, 128.0 (C-1/C-2), 165.6 (C-3), 58.0 (CH$_2$) ppm. Furan ring: 149.4 (C-2'), 110.6, 110.5 (C-3', C-4'), 143.2 (C-5') ppm. CI-Mass Spectrometry. m/z: 152 (M$^+$), 97 [(OCH$_2$-fur)$^+$], 81 (main peak) [(CH$_2$-fur)$^+$], 55 [(CH$_2$CHCO)$^+$]. HRMS: Theoretical molecular weight for C$_8$H$_8$O$_3$ (M$^+$) 152.047344, experimental molecular weight: 152.046924.

Example 2

Synthesis of Furfuryl Isobutyrate

Scheme 2: Reaction scheme for the synthesis of Furfuryl Isobutyrate

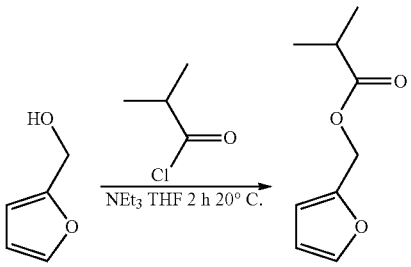

Furfuryl alcohol (5 mL, 1 eq.) was dissolved in THF (20 mL) in a dry, round bottomed flask and stirred with triethylamine (10 mL, 1.25 eq.). The solution was cooled to 5° C. and isobutyryl chloride (60.1 mL, 1.0 eq.) was added dropwise. The mixture was stirred for 2 h at 20° C. The reaction was worked up by diluting with dichloromethane (30 mL) and filtered through a celite plug to remove the triethylammonium chloride, and the solvent was removed under vacuum. The residue was purified by silica column chromatography using tert-butylmethyl ether-hexane (1:5) ($R_f$ 0.54) to give an oil (8.5 g 87.5% yield). IR (cm$^{-1}$): 1737 (C=O st), 3145, 3124 (=C—H st), 816, 745 (C—H δ, furan ring). $^1$H NMR (CDCl$_3$, 300 MHz): δ 2.57 (sept, 1H, C—H(CH$_3$)$_2$, J=6.9 Hz), 1.17 (d, 6H, CH(CH$_3$)$_2$, J=6.9 Hz), 5.0$\overline{6}$ (s, 2H, CH$_2$O) ppm. Furan ring: 6.39 ($\overline{bd}$, 1H, H-3', $J_{3',4'}$=3.3 Hz), 6.35 (dd, 1H, H-4', $J_{4',5'}$=1.8 Hz), 7.41 (m, 1H, H-5') ppm. $^{13}$C NMR (CDCl$_3$, 75 MHz): δ 176.7 (C=O), 33.9 [CH(CH$_3$)$_2$], 18.9 [CH(CH$_3$)$_2$] ppm. Furan ring: 149.8 (C-2'), 110.5, 110.3 (C-3', C-4'), 143.1 (C-5') ppm. CI-Mass Spectrometry. m/z: 168 (M$^+$), 97 [(OCH$_2$-fur)$^+$], 81 (main peak) [(CH$_2$-fur)$^+$], 71 [(CH$_3$)$_2$CHCO)$^+$]. HRMS: Theoretical molecular weight for C$_9$H$_{12}$O$_3$ (M$^+$) 168.078644, experimental molecular weight: 168.078182.

Example 3

Synthesis of Poly(acrylamide-co-furfuryl acrylate)

Scheme 3: Reaction scheme for the copolymerization of furfuryl acrylate with acrylamide

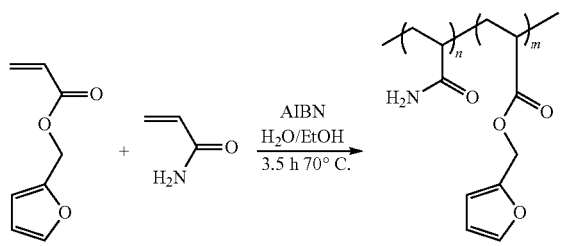

For a typical procedure acrylamide (4.5 g, 95 mol %) was dissolved in H$_2$O (60 mL) in a 250 ml, round bottomed flask. The second monomer (furfuryl acrylate, 0.5 g, 5 mol %) was dissolved in ethanol (6 mL) and added. The solution for degassed by 10 cycles of vacuum/argon at 30° C., and 2,2'-azobis(2-methylpropionitrile) initiator (4 mg) was added. The reaction was left stirring at 70° C. for 3.5 h. Acetone (200 mL) was added to the copolymer solution and the precipitation of the copolymer was promoted by the addition of sodium dodecyl sulfate (0.5 g). The copolymer was redissolved in H$_2$O (60 mL) and the precipitation procedure was repeated until the copolymer was pure (3.9 g, 78% yield). The copolymer was freeze dried and stored in a dessicator. Elemental Analysis: Copolymer 1 theoretical: C, 44.93; H, 7.45; N, 15.18; poly(acrylamide$_{95\%}$-furfuryl acrylate$_{5\%}$), experimental: C, 44.72; H, 7.292; N, 15.03; poly(acrylamide$_{93\%}$-furfuryl acrylate$_{7\%}$), Copolymer 2 theoretical: C, 46.26; H, 7.39; N, 16.99; poly(acrylamide$_{98\%}$-furfuryl acrylate$_{2\%}$), experimental: C, 44.72; H, 7.441; N, 16.82; poly(acrylamide$_{97\%}$-furfuryl acrylate$_{3\%}$). $^1$H NMR (CDCl$_3$, 500 MHz): δ 7.90-6.20 (m, furan ring), 2.45-2.05 (m, CH polymer backbone) 1.95-1.30 (m, CH$_2$ polymer backbone), 5.04-5.30 (m, CH$_2$OCO— furfuryl acrylate) $^1$H NMR compositions: Copolymer 1 poly(acrylamide$_{92\%}$-furfuryl acrylate$_{8\%}$); Copolymer 2 poly(acrylamide$_{98\%}$-furfuryl acrylate$_{2\%}$). I.R. (cm$^{-1}$): 3356 (N—H st), 1654 (C=O st amide I), 1543 (N—C=O st amide II), 1137 (NH 6 NH$_2$C=O).

Example 4

Synthesis of 3,6-Dioxa-1,8-octanedimaleimide

Scheme 4: Reaction scheme for the synthesis of 3,6-Dioxa-1,8-octanedimaleimide

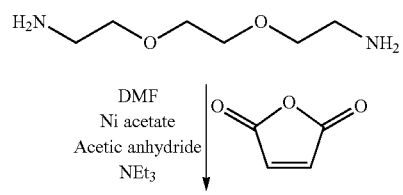

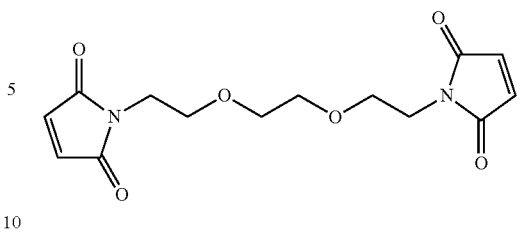

Two solutions were prepared, one of 3,6-dioxa-1,8-octanediamine (7.84 mL, 1 eq.) in DMF (16 mL), and the other of maleic anhydride (10.5 g, 2 eq.) in DMF (32 mL). The two solutions were added together, making sure that the temperature did not exceed 80° C., and it was then allowed to stir at 80° C. for 20 mins. Acetic anhydride (20.23 mL, 4 eq.), nickel acetate (106 mg, 0.008 eq.) and triethylamine (3 mL, 0.4 eq.) were then added and the solution was stirred at 80° C. for 1 h. H$_2$O (40 mL) was added and the residue was extracted with dichloromethane (300 mL). The organic layer was dried with magnesium sulfate and stirred with silica (70 g), filtered through a celite column and washed with chloroform (400 mL). The slightly coloured solution was dried under vacuum and purified by silica column chromatography using tert-butylmethyl ether-hexane (9:1) (tert-butylmethyl ether R$_f$ 0.33) (11.89 g 72.1% yield). Melting point: 96.5-97.8° C. IR (cm$^{-1}$): 1703 (C=O st), 3168, 3100 (=C—H st), 1109 (O—CH$_2$ st). $^1$H NMR (CDCl$_3$, 500 MHz): δ 6.72 (s, 4H, =CH), 3.72 (t, 4H, N—CH$_2$, J=5.8 Hz), 3.62 (t, 4H, N—CH$_2$—CH$_2$O—, J=5.8 Hz), 3.56 (s, 4H, O—CH$_2$—CH$_2$O—) ppm. $^{13}$C NMR (CDCl$_3$, 125 MHz): δ 170.64 (C=O), 134.14 (=CH), 70.06, 67.82 (N—CH$_2$—CH$_2$O—), 37.17 (O—CH$_2$—CH$_2$O—) ppm. CI-Mass Spectrometry. m/z: 309 [(M+1)$^+$], 124 [(C$_4$H$_2$O$_2$N—CH$_2$—CH$_2$)$^+$], 184 [(M−124)$^+$]. Elemental Analysis: theoretical: C, 54.54; H, 5.23; N, 9.09; experimental: C53.90; H, 4.96; N, 8.999.

Example 5

Diels-Alder Crosslinking

Typical procedure for the Diels-Alder reaction with furfuryl isobutyrate:

Scheme 5: Reaction scheme for the Diels-Alder reaction of furfuryl isobutyrate with 3,6-dioxa-1,8-octanedimaleimide

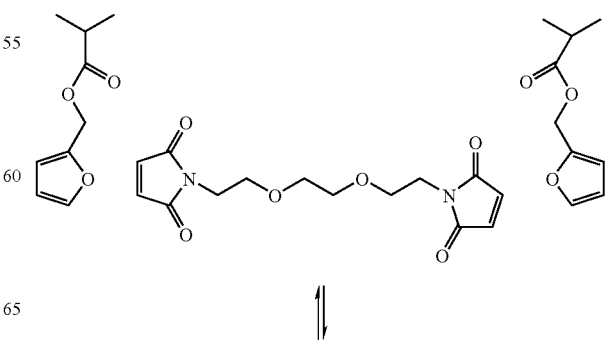

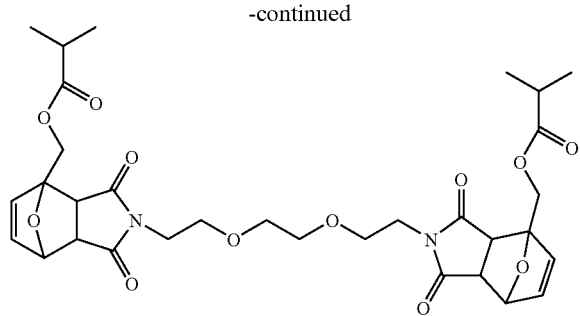

3,6-Dioxa-1,8-octanedimaleimide (289 mg, 0.938 mmol, 0.9 eq.) was dissolved in dichloromethane (3 mL) and furfuryl isobutyrate (350 mg, 2.08 mmol, 2 eq.) was added. This was left stirring at 20° C. for 160 h. The Diels-Alder adduct was purified by silica column chromatography using first dichloromethane ($R_f$ 0.15) and then dichloromethane-methanol (10:1) ($R_f$ 0.73). A colourless oil was obtain (495 mg, 82% yield) with and endo-exo ratio 78/22. IR (cm$^{-1}$): 3086 (=C—H st), 1737 (C=O st ester), 1702 (C=O st imide), 1192 (C—O st ester), 1110 (O—CH$_2$ st). The bands corresponding to the furan ring are not present (as 816, 745 cm$^{-1}$, C—H δ corresponding to the furan ring). $^1$H NMR (CDCl$_3$, 500 MHz—see below for assignments): δ 3.53 (s, 4H, H$_a$), 3.58-3.51 (m, 8H, H$_b$, H$_c$), 5.35 (d, 2H, H$_{d1}$, J$_{d1,d2}$=12.8 Hz), 4.63 (d, 2H, H$_{d2}$), 2.67 (sept, 2H, H$_e$, J$_{e,f}$=7.0 Hz), 1.22 (d, 12H, H$_f$), 6.48 (dt, 2H, H$_g$, J$_{g,h}$=5.7 Hz, J$_{g,i}$=J$_{g,j}$=1.6 Hz), 6.33 (dd, 2H, H$_h$, J$_{h,i}$=2.1 Hz), 5.34 (m, 2H, H$_i$, J$_{i,j}$=5.6 Hz, J$_{i,k}$=1.3 Hz), 3.68 (m, 2H, H$_j$, J$_{j,k}$=7.7 Hz), 3.40 (dd, 2H, H$_k$) ppm. $^{13}$C NMR (CDCl$_3$, 125 MHz): δ 37.75 (C$_a$), 69.90, 67.04 (C$_b$, C$_c$), 61.82 (C$_d$), 33.86 (H$_e$), 18.95 (C$_f$), 135.62 (C$_g$), 134.44 (C$_h$), 79.64 (C$_i$), 89.92 (C$_i$, quaternary carbon in bicyclic systems), 47.79 (C$_j$), 46.73 (C$_k$), 176.52, 174.44 (C=O) ppm. FAB-Mass Spectrometry. m/z: 667 [(M+23)$^+$], 499 [(M+23-168)$^+$], 331 (main peak) [(308+23)$^+$=(C$_{14}$H$_{16}$N$_2$O$_6$Na)$^+$= (M$_{DOODM}$+Na)$^+$], 309 (308+1)$^+$=(M$_{DOODM}$+H)$^+$], 124 [(C$_4$H$_2$O$_2$N—CH$_2$—CH$_2$)$^+$], 81 [(CH$_2$-fur)$^+$]. CI-Mass Spectrometry. m/z: 309 (308+1)$^+$=(M$_{DOODM}$+H)$^+$], 124 [(C$_4$H$_2$O$_2$N—CH$_2$—CH$_2$)$^+$] 81 (main peak) [(CH$_2$-fur)$^+$].

Example 6

Typical Procedure for the Diels-Alder Reaction with the Copolymer

Scheme 6: Reaction scheme for the Diels-Alder reaction of P(AM-FA) with 3,6-Dioxa-1,8-octanedimaleimide

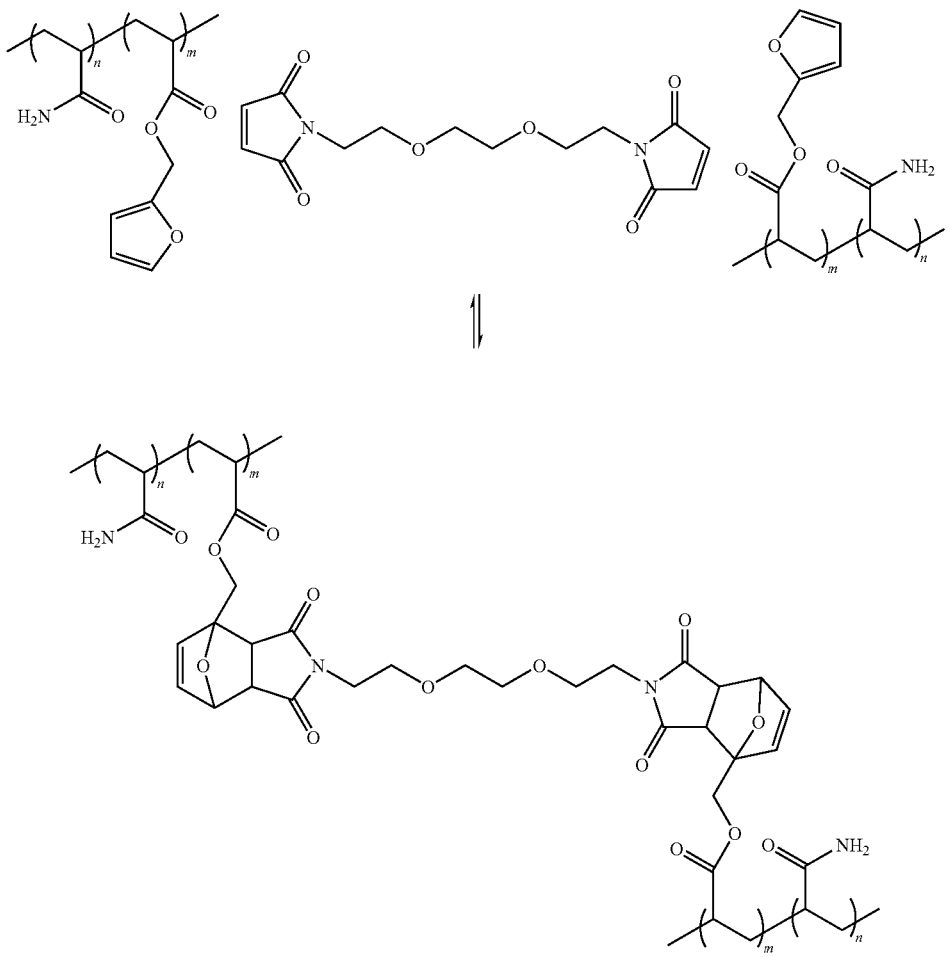

P(AM$_{93}$FA$_7$) (303 mg, 0.276 mmol furfuryl acrylate) was dissolved in water (3.6 mL) and stirred for 1 h. 3,6-Dioxa-1,8-octanedimaleimide (43.4 mg, 0.141 mmol, 2% excess) dissolved in DMF (0.5 mL) was added and the reaction mixture was stirred at room temperature. The final copolymer concentration in the homogeneous mixture was 8.5 w/v %.

Figure 2:
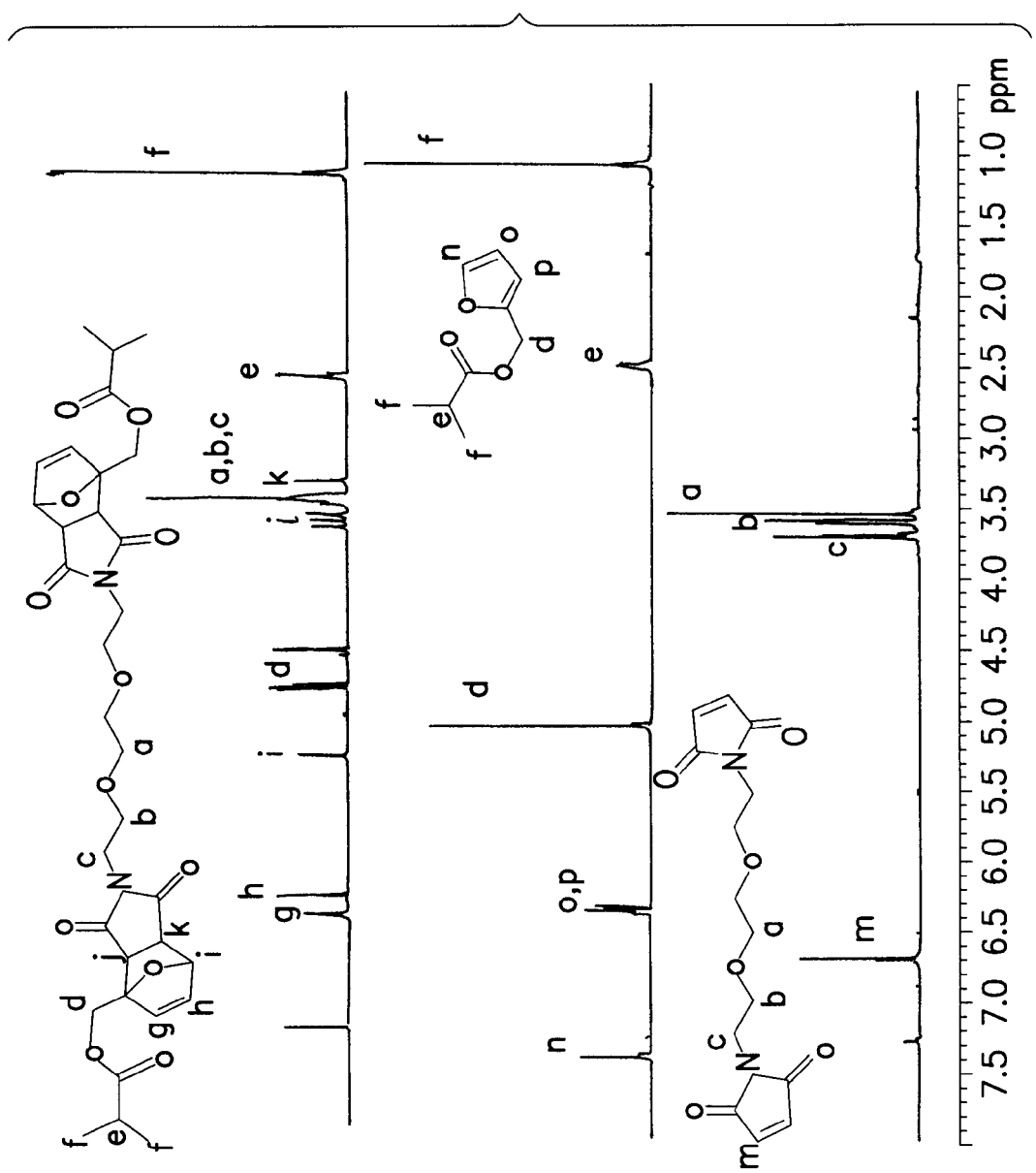
FIG. 2 shows the $^1$H NMR spectra of 3,6-dioxa-1,8-octanedimaleimide (bottom), furfuryl isobutyrate (middle) and the Diels-Alder product (top) which indicates that the Diels-Alder reaction has taken place.

The first attempt at the Diels-Alder reaction was carried out using the model compound furfuryl isobutyrate with 3,6-dioxa-1,8-octanedimaleimide in dichloromethane, a solvent in which both molecules were completely soluble. The reaction scheme is shown in Scheme 1. The $^1$H NMR spectra of 3,6-dioxa-1,8-octanedimaleimide (bottom), furfuryl isobutyrate (middle) and the Diels-Alder product (top) shown in FIG. 2 indicates that the Diels-Alder reaction has taken place.

The $^1$H NMR and $^{13}$C NMR spectra are fully elucidated (see experimental). The chemical shifts and integrals obtained from the $^1$H NMR spectrum indicate the formation of the Diels-Alder adduct at both maleimide sites of the bisdienophile 3,6-dioxa-1,8-octanedimaleimide. This is also confirmed by the displacement and difference of the methylene protons (protons "d"), which appear as a singlet at 5.06 ppm in the starting material furfuryl isobutyrate, but behave as diastereotopic protons, d$_1$ (doublet) and d$_2$ (doublet), at 5.35 and 4.63 ppm respectively, in the product. On comparing the integrals from the "d" oxymethylene protons in the $^1$H NMR of the crude reaction solution (not shown), the stereoselectivity of the Diels-Alder reaction is observed, with an endo:exo ratio of 78:22.

The model Diels Alder compound has been studied by both chemical ionisation (CI) and fast atom bombardment (FAB) mass spectrometry. Interesting, in the CI mass spectrum (carried out at temperatures over 80° C.) only fragmentations of the starting materials were observed. Furthermore, since the highest m/z peak in the CI-MS (309) is due to (M$_{DOODM}$+H)$^+$, and there are no fragmentation peaks from the Diels-Alder product, it can be concluded that the retro Diels-Alder reaction has taken place entirely under these conditions. Since the $^1$H NMR spectrum shown above has no diene in the product, it is likely that the retro Diels-Alder reaction has occurred at these higher temperatures.

FAB mass spectrometry corroborates the formation of the Diels-Alder adduct, with the highest m/z peak of the purified product observed at 667 [(M+23)$^+$=(M+Na)$^+$], verifying that the Diels-Alder reaction had occurred at both ends of the bisdienophile. Although this is a room temperature technique, the sample temperature can be gently increased as a consequence of the atom bombardment, and remarkably, evidence of the retro Diels Alder taking place under these mild conditions was observed. The peak at 499 [(M+23−168)$^+$=(M+Na−furfuryl isobutyrate)$^+$] corresponds to the subproduct obtained from the retro Diels Alder reaction occurring at one site of the analysed product, with elimination of one furfuryl isobutyrate molecule. The peaks at 331 [308+23)$^+$= (M$_{DOODM}$+H)$^+$], 309 (308+1)$^+$=(M$_{DOODM}$+H)$^+$], 124 [(C$_4$H$_2$O$_2$N—CH$_2$—CH$_2$)$^+$] and 81 [(CH$_2$-fur)$^+$] correspond to the bisdienophile and the diene, produced as a consequence of the retro Diels-Alder reaction.

Two copolymers were synthesised (theoretical compositions: Copolymer 1 poly(acrylamide$_{95\%}$-furfuryl acrylate$_{5\%}$) p(AM$_{95\%}$-FA$_{5\%}$) and Copolymer 2 poly(acrylamide$_{98\%}$-furfuryl acrylate$_{2\%}$) p(AM$_{98\%}$-FA$_{2\%}$)), and their compositions were calculated by elemental analysis (actual compositions: Copolymer 1 (p(AM$_{93\%}$-FA$_{7\%}$) and Copolymer 2 (p(AM$_{97\%}$-FA$_{3\%}$)). It is clear that the copolymerisation procedure reported here, using ethanol as a co-solvent, gives copolymers that have an actual composition (by elemental analysis and $^1$H NMR) which is in excellent agreement with the theoretical.

Figure 3:
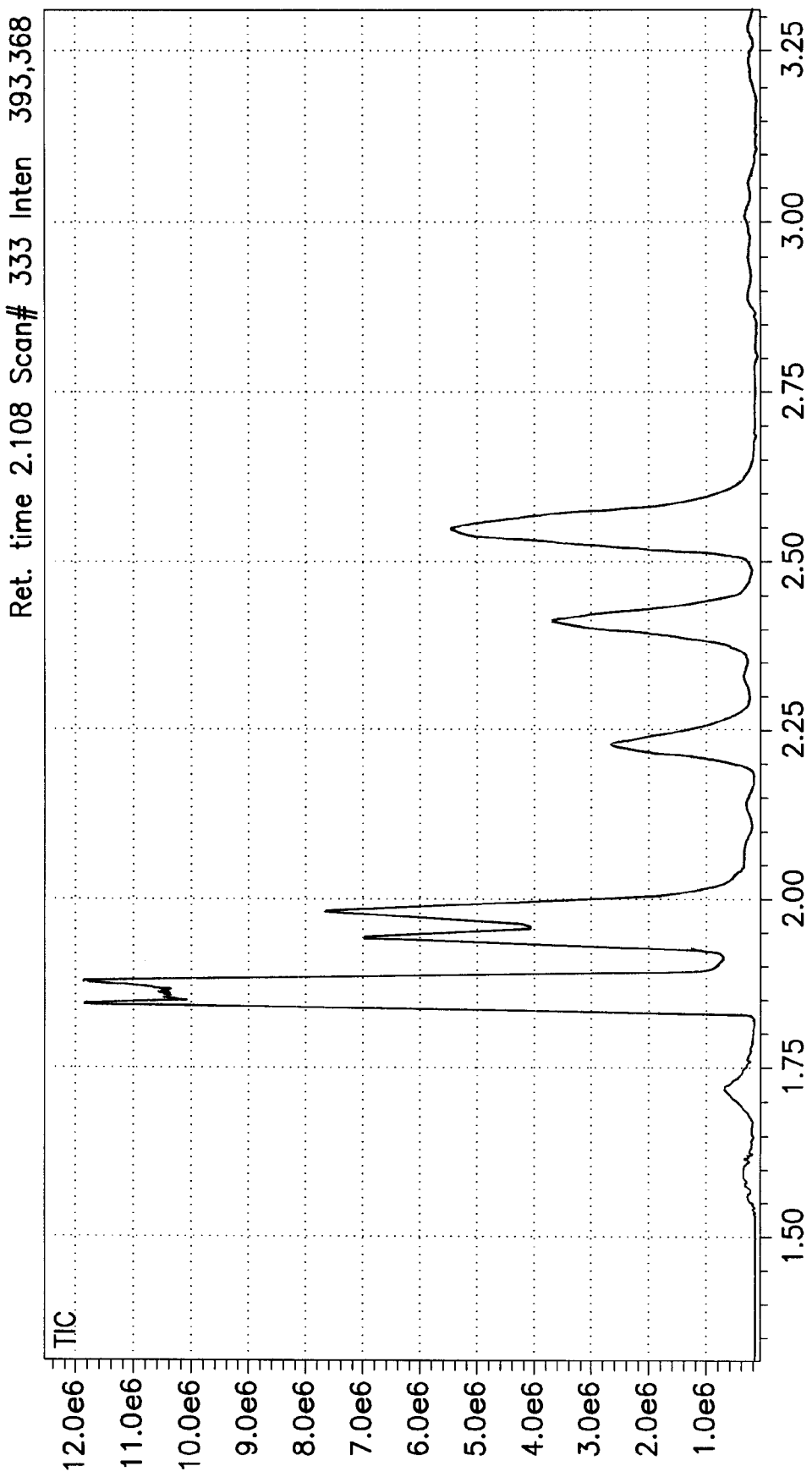
FIG. 3 shows the pyrolysis GCMS spectrum (between 1.25 and 3.25 mins) of poly(acrylamide-co-furfuryl acrylate $(AM_{97\%}\text{-}FA_{3\%})$ which was used to confirm qualitatively the presence of the second monomer.

Pyrolysis GCMS was also used to confirm qualitatively the presence of the second monomer. Shown in FIG. 3 is the pyrolysis GCMS spectrum (between 1.25 and 3.25 mins) of poly(acrylamide-co-furfuryl acrylate (AM$_{97\%}$-FA$_{3\%}$).

Acrylonitrile, propionitrile and methacrylonitrile have all been identified in this spectrum with good confidence (>95%) by the NIST library. Along with these typical poly(acrylamide) peaks are signals identified as 2-methyl furan (2.6 mins, 90% confidence), 2-2-furanylmethyl-5-methylfuran (17.4 mins, 78% confidence) and 3,4-dimethyl-2,5-furandione (18.5 mins, 83% confidence), implying there is some furfuryl acrylate incorporated in the copolymer.

The thermal degradation of poly(acrylamide) has been previously reported (Tutas, M.; Saglam, M.; Yuksel, M. *J. Anal. Appl. Pyrolysis* 1991, 22, 129-137). Unlike other polymers studied by pyrolysis gas chromatography, no acrylamide monomer was seen, instead five major pyrolysis products were identified, namely acrylonitrile, propionitrile, methacrylonitrile acetonitrile, and isobutyronitrile. It is thought that during pyrolysis, the primary amide functional groups pendant from the polymer backbone lose water and transform into nitrile functional groups. This explains why the spectrum of poly(acrylamide) shows the same pyrolysis products as poly(acrylonitrile).

The Diels-Alder reactions for the two copolymers with 3,6-dioxa-1,8-octanedimaleimide were next examined. Although both copolymers molecularly dissolved in the water:DMF solution, a gel formation was observed by eye after 2 days. To monitor the Diels-Alder reaction, viscosity measurements were made on three solutions: Solution 1 p(AM$_{93\%}$-FA$_{7\%}$), Solution 2 p(AM$_{93\%}$-FA$_{7\%}$)/3,6-dioxa-1,8-octanedimaleimide (0.5 molar equivalents based on the moles of furan in the copolymer) and Solution 3 p(AM$_{97\%}$-FA$_{3\%}$)/3,6-dioxa-1,8-octanedimaleimide (0.5 molar equivalents based on the moles of furan in the copolymer).

Figure 4:
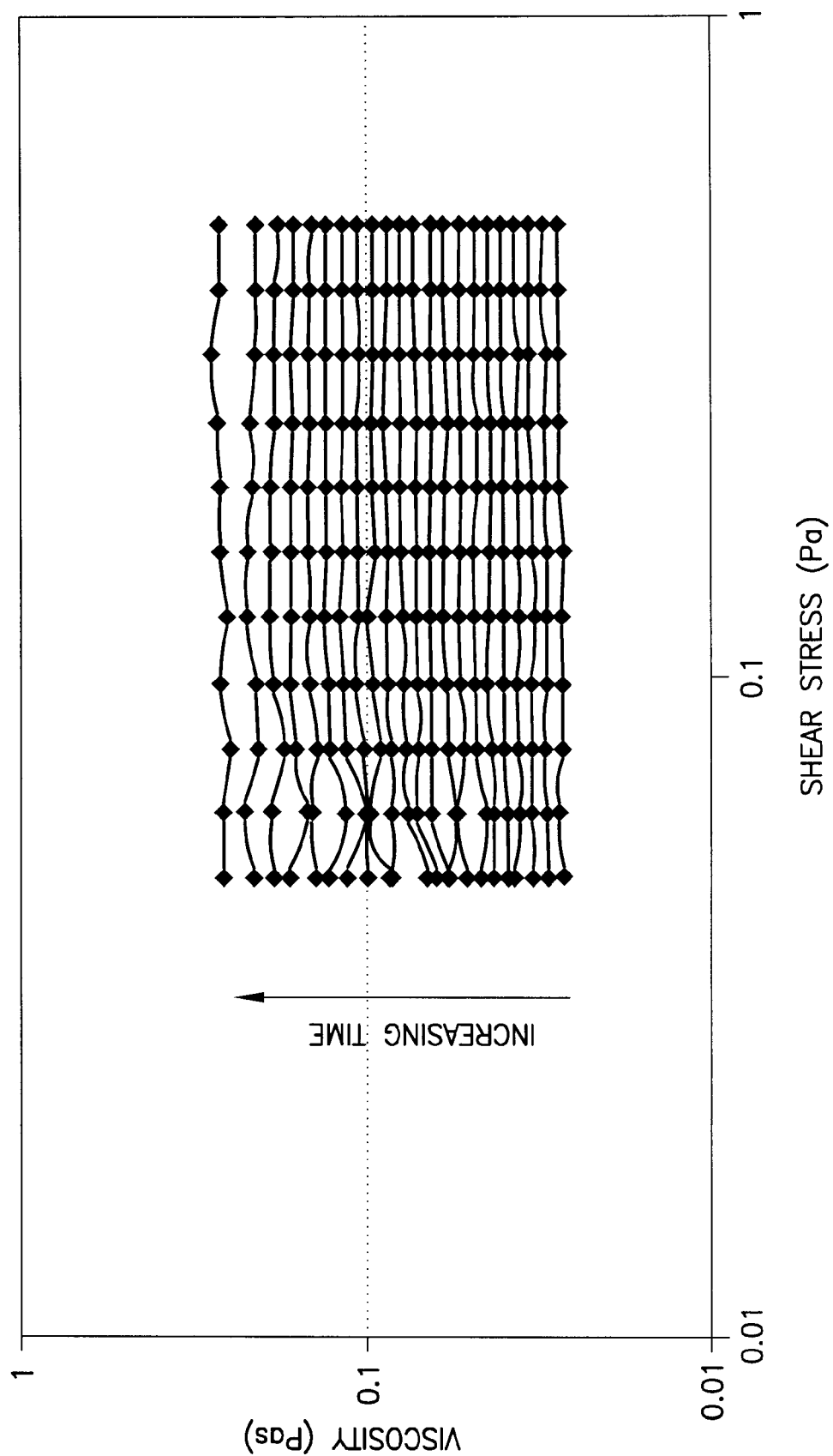
FIG. 4 shows the results for the viscosity vs. shear stress for the Diels-Alder reaction between $p(AM_{93\%}\text{-}FA_{7\%})$ and 3,6-dioxa-1,8-octanedimaleimide (solution 2).

For the range of shear stresses investigated, each solution showed Newtonian behavior. Viscosity as a function of stress was measured repeatedly with a 30 min time interval for 14 hours. The results for the viscosity vs. shear stress for the Diels-Alder reaction between p(AM$_{93\%}$-FA$_{7\%}$) and 3,6-dioxa-1,8-octanedimaleimide (solution 2) are shown in FIG. 4.

As shown above, a clear increase in viscosity is seen over the experimental time. Since these viscosity changes could be due to evaporation, aging or Diels-Alder crosslinking, the viscosity as a function of stress was measured for Solution 1, where no bisdienophile crosslinker was added.

Figure 5:
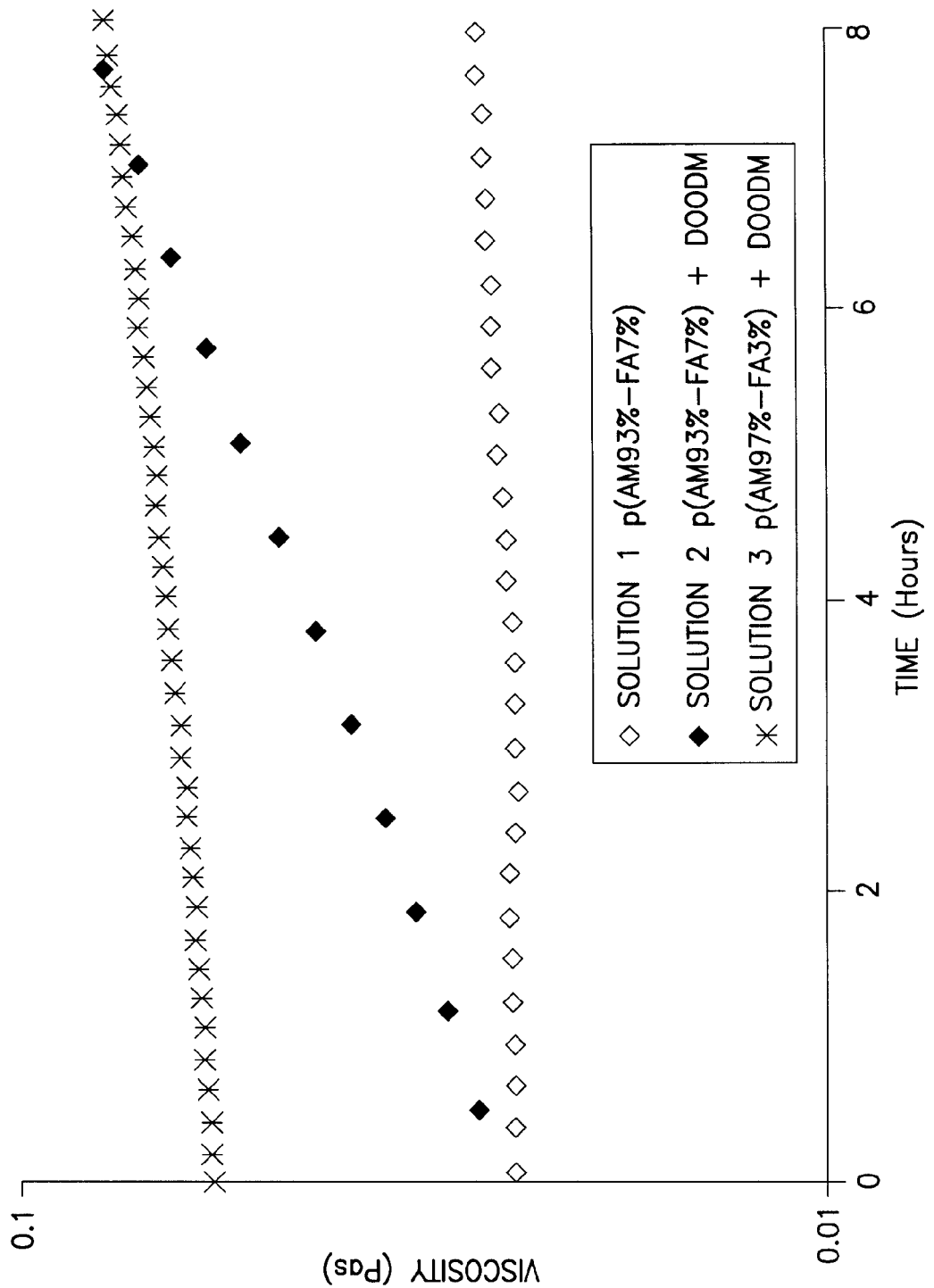
FIG. 5 shows the plot of viscosity as a function of time measured at 0.16 Pa for $p(AM_{93\%}\text{-}FA_{7\%})$ (white diamonds) and the reaction of $p(AM_{93\%}\text{-}FA_{7\%})$ plus 3,6-dioxa-1,8-octanedimaleimide (black diamonds) and $p(AM_{97\%}\text{-}FA_{3\%})$ plus 3,6-dioxa-1,8-octanedimaleimide (stars), i.e., solutions 1, 2 and 3, respectively.

FIG. 5 shows a plot of viscosity as a function of time measured at 0.16 Pa for p(AM$_{93\%}$-FA$_{7\%}$) (white diamonds) and the reaction of p(AM$_{93\%}$-FA$_{7\%}$) plus 3,6-dioxa-1,8-octanedimaleimide (black diamonds) and p(AM$_{97\%}$-FA$_{3\%}$) plus 3,6-dioxa-1,8-octanedimaleimide (stars), i.e., solutions 1, 2 and 3, respectively.

Over the 8 hours investigated, the increase in viscosity for Solution 1 is negligible, whereas Solution 2 increases by an order of magnitude (0.0269 Pa s to 0.269 Pa s). Since Solution 1 showed very little viscosity increase, the effects of aging and evaporation on the viscosity profiles of these solutions can be eliminated. On comparing Solutions 2 and 3, although Solution 3 (p(AM$_{97\%}$-FA$_{3\%}$)/3,6-dioxa-1,8-octanedimaleimide) has a higher viscosity than Solution 2 (p(AM$_{93\%}$-FA$_{7\%}$)/3,6-dioxa-1,8-octanedimaleimide) due to its greater acrylamide content, its viscosity increase over time is not as significant (Solution 2 increase 0.2421 Pa s, Solution 3 increase 0.0189 Pa s). This can be attributed to its smaller content of furfuryl acrylate monomer, giving less reactive groups for the Diels-Alder reaction to take place compared to Solution 2.

Liu et al. described the formation of polymeric gels from the Diels-Alder reaction of maleimide and furan groups in dimethylacetamide (25 wt %) at 30° C. (Liu, Y. L.; Hsieh, C. Y.; Chen, Y. W. *Polymer* 2006, 47, 2581-2586). The observed gel times, monitored by eye, for their systems were 10-54 days, depending on the content of reactive groups. In contrast, our aqueous 10 wt % solutions reached a gel-like viscosity of 0.1 Pa s within 10 hours, again indicating the increased rate of the Diels-Alder reaction in water.

Figure 6:
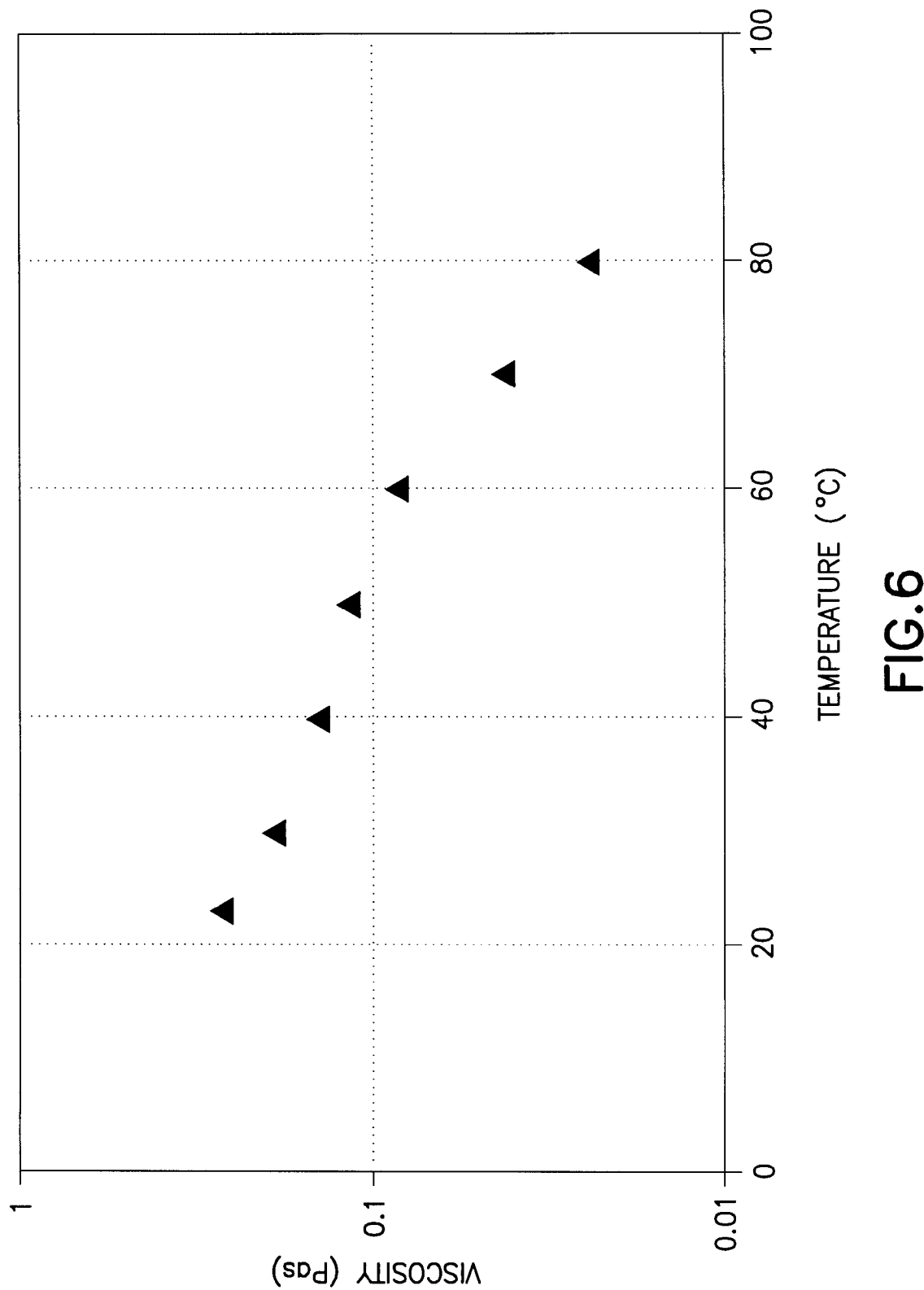
FIG. 6 shows viscosity as a function of temperature was measured for Solution 2 ($p(AM_{93\%}\text{-}FA_{7\%})$ and 3,6-dioxa-1,8-octanedimaleimide).

Finally, viscosity as a function of temperature was measured for Solution 2 (p(AM$_{93\%}$-FA$_{7\%}$) and 3,6-dioxa-1,8-octanedimaleimide) and is shown in FIG. 6. It shows the viscosity at 0.25 Pa after 14 h of Diels-Alder reaction between p(AM$_{93\%}$-FA$_{7\%}$) and 3,6-dioxa-1,8-octanedimaleimide, at temperatures of 23, 30, 40, 50, 60, 70 and 80° C.

As expected, the viscosity drops as the temperature is increased, and since the mass spectrometry data has verified that the retro Diels-Alder reaction takes places at temperature higher than 80° C., it can be assumed that this de-crosslinking plays some part in the observed decrease in viscosity.

In conclusion, the Examples above disclose a systematic study carried out to look at the Diels-Alder reaction of poly (acrylamide-co-furfuryl acrylate) with 3,6-dioxa-1,8-octanedimaleide. The furfuryl monomer was synthesized, fully characterised and copolymerized with acrylamide. The elemental analysis results for these copolymers showed an excellent agreement between the theoretical and actual compositions.

A model compound, namely furfuryl isobutyrate, was synthesized and used to examine the Diels-Alder reaction with 3,6-dioxa-1,8-octanedimaleide. The Diels-Alder reaction between the copolymers and 3,6-dioxa-1,8-octanedimaleimide bisdienophile was next examined. These reactions formed gels at room temperature within 10 hours, and on increasing the temperature above 80° C. their viscosity returned to its original value. This is significant since it is the first account of thermally reversible polymeric networks in aqueous media via Diels-Alder chemistry.

While the principles of the disclosure have been described above in connection with specific apparatuses and methods, it is to be clearly understood that this description is made only by way of example and not as limitation on the scope of the disclosure.

What is claimed is:
1. A process comprising the steps of
  supplying via a wellbore to a subterranean location, an oilfield fluid comprising a viscosifying agent selected from
  a polymer accompanied by a crosslinking agent therefor and the crosslinked product of a polymer and crosslinking agent,
  wherein one of said polymer and said cross-linking agent comprises diene groups and the other of them comprises dienophile groups, and
  exposing the fluid to conditions at the subterranean location, which induce or reverse a Diels-Alder reaction between the polymer and crosslinking agent, thereby altering fluid viscosity at the subterranean location by converting between a condition in which the fluid contains polymer and crosslinking agent and a more viscous alternative condition in which the fluid contains the crosslinked product of said polymer and crosslinking agent.
2. A process according to claim 1 wherein the crosslinked product is a compound of formula I:

(I)

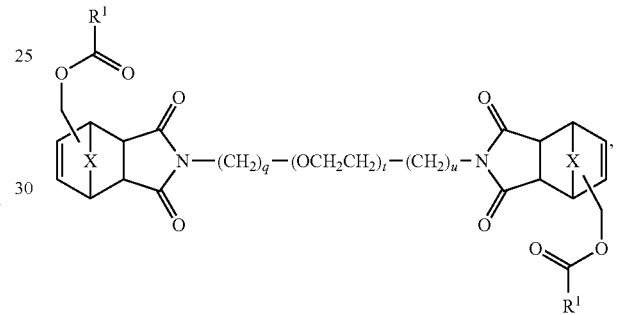

wherein:
R$^1$ is an acrylate/acrylate copolymer, an acrylate/(meth)acrylate copolymer, or a (meth)acrylate/(meth)acrylate copolymer;
X is CH$_2$, O, S(O)$_v$ or NR$^2$;
v is an integer selected from 0 to 2;
R$^2$ is hydrogen or alkyl; and
q, t and u are each integers, each independently selected from 0 to 100.
3. The process of claim 2, wherein R1 is an acrylate/acrylate copolymer; and X is O.
4. The process of claim 2, wherein the compound of formula I has formula III:

(III)

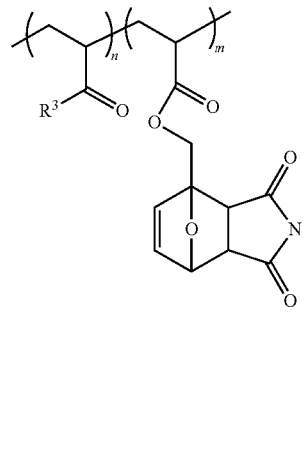
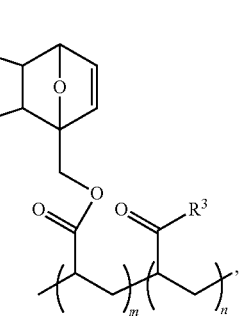

wherein R³ is —NH₂, —NHalkyl, —N(alkyl)₂, —OH, -Oalkyl; -Oaryl, alkyl, aryl or arylalkyl.

5. The process of claim 4, wherein R³ is —NH₂; q is 3; t is 35; and u is 1.

6. The process of claim 4, wherein R³ is —NH₂; q is 2; t is 2; and u is 0.

7. A process according to claim 1 wherein the crosslinked product is a compound of formula IV:

(IV)

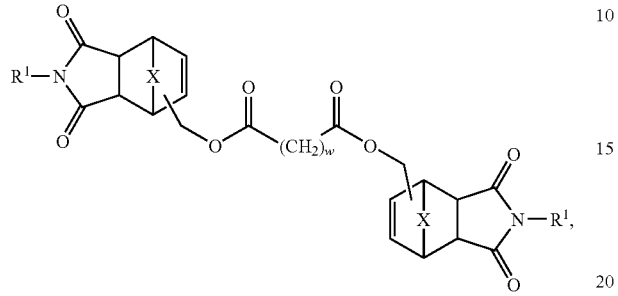

wherein:
R¹ is an acrylate/acrylate copolymer, an acrylate/(meth)acrylate copolymer, or a (meth)acrylate/(meth)acrylate copolymer;
X is O, S(O)ᵥ or NR²;
v is an integer selected from 0 to 2;
R² is hydrogen or alkyl; and
w is an integer selected from 1 to 100.

8. The process of claim 7, wherein R¹ is an acrylate/acrylate copolymer; and X is O.

9. The process of claim 7, wherein the compound of formula IV has formula VI:

(VI)

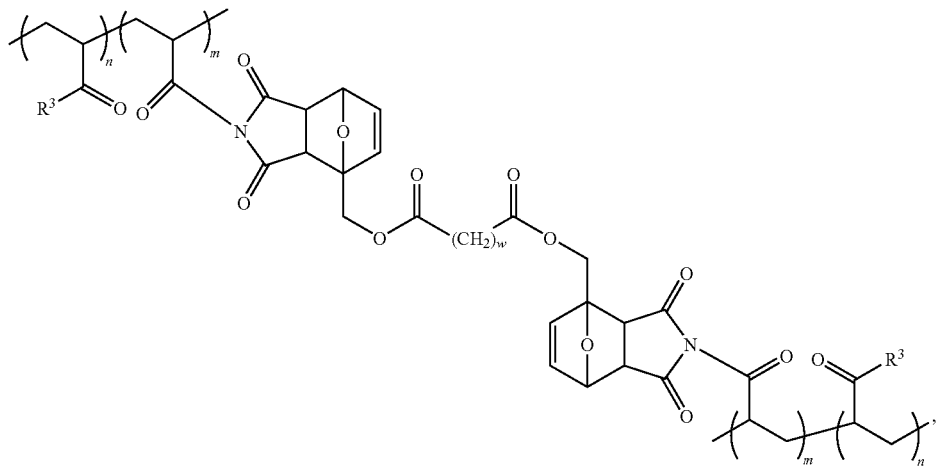

wherein R³ is —NH₂, —NHalkyl, —N(alkyl)₂, —OH, -Oalkyl; -Oaryl, alkyl, aryl or arylalkyl.

10. The process of claim 9, wherein R³ is —NH₂; and w is 4.

11. A process according to claim 1 wherein the polymer is a compound of formula VII:

(VII)

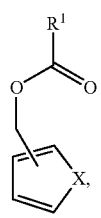

wherein:
R¹ is an acrylate/acrylate copolymer, an acrylate/(meth)acrylate copolymer, or a (meth)acrylate/(meth)acrylate copolymer;
X is O, S(O)ᵥ or NR²;
v is an integer selected from 0 to 2; and
R² is hydrogen or alkyl.

12. The process of claim 11, wherein R¹ is an acrylate/acrylate copolymer; and X is O.

13. The process of claim 11, wherein the compound of formula VII has formula VIII:

(VIII)

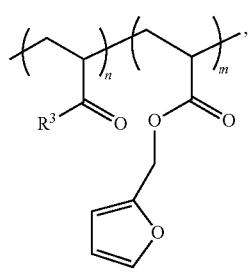

wherein R³ is —NH₂, —NHalkyl, —N(alkyl)₂, —OH, -Oalkyl; -Oaryl, alkyl, aryl or arylalkyl.

14. The process of claim 13, wherein R³ is —NH₂.

15. A process according to claim 1 wherein the polymer is a compound of formula X:

(X)

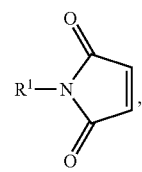

wherein R¹ is an acrylate/acrylate copolymer, an acrylate/(meth)acrylate copolymer, or a (meth)acrylate/(meth)acrylate copolymer.

16. The process of claim 15, wherein R¹ is an acrylate/acrylate copolymer.

17. The process of claim 15, wherein the compound of formula X has formula XI:

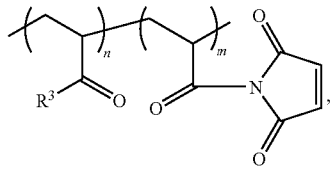 (XI)

wherein R³ is —NH₂, —NHalkyl, —N(alkyl)₂, —OH, -Oalkyl; -Oaryl, alkyl, aryl or arylalkyl.

18. The process of claim 17, wherein R³ is —NH₂.

19. The process of claim 1 wherein the oilfield fluid is one of a fracturing fluid, a drilling fluid, a diverting fluid and a gravel packing fluid.

20. A process comprising the steps of
supplying via a wellbore to a subterranean location, an oilfield fluid comprising a viscosifying polymer with a crosslinking agent therefor, wherein one of said polymer and said cross-linking agent comprises diene groups and the other of them comprises dienophile groups, and
exposing the fluid to conditions at the subterranean location, which induce a Diels-Alder reaction between the polymer and crosslinking agent, thereby increasing fluid viscosity by converting the polymer and crosslinking agent to their crosslinked product.

21. A process according to claim 20 further comprising returning the fluid from the subterranean location to the surface and there exposing the fluid to conditions which induce a retro-Diels-Alder reaction to uncouple the crosslinked product back into the polymer and cross-linking agent and thereby reduce the viscosity of the fluid.

22. The process of claim 20 wherein the crosslinking agent has formula selected from formula IX:

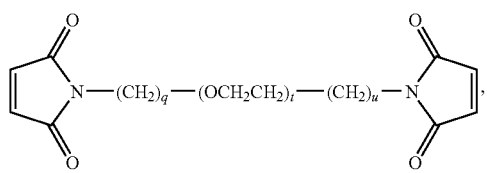 (IX)

wherein q, t and u are each integers, each independently selected from 0 to 100; and formula XII:

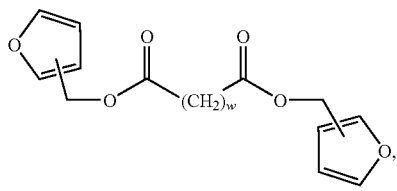 (XII)

wherein w is an integer selected from 1 to 100.

23. The process of claim 22, wherein the compound of formula XII has formula XIII:

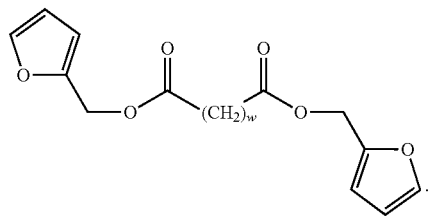 (XIII)

24. The process of claim 20, wherein the fluid is used as one of a fracturing fluid, a drilling fluid, a diverting fluid and a gravel packing fluid.

25. A process according to claim 20 wherein the polymer is a compound of formula VII:

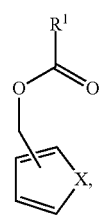 (VII)

wherein:
R¹ is an acrylate/acrylate copolymer, an acrylate/(meth)acrylate copolymer, or a (meth)acrylate/(meth)acrylate copolymer;
X is O, S(O)ᵥ or NR²;
v is an integer selected from 0 to 2; and
R² is hydrogen or alkyl.

26. A process according to claim 20 wherein the polymer is a compound of formula X:

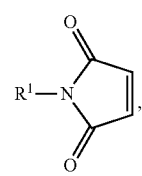 (X)

wherein R¹ is an acrylate/acrylate copolymer, an acrylate/(meth)acrylate copolymer, or a (meth)acrylate/(meth)acrylate copolymer.

27. A process comprising steps of
supplying via a wellbore to a subterranean location, an oilfield fluid comprising a viscosifying crosslinked reaction product of a polymer and a crosslinking agent, wherein one of said polymer and said cross-linking agent comprises diene groups and the other of them comprises dienophile groups, and
exposing the fluid to conditions at the subterranean location which induce a retro-Diels-Alder reaction to uncouple the crosslinked product into the polymer and cross-linking agent and thereby reduce the viscosity of the fluid.

28. The process of claim 27, wherein the fluid is used as one of a fracturing fluid, a drilling fluid, a diverting fluid and a gravel packing fluid.

29. A process according to claim 27 wherein the crosslinked product is a compound of formula I:

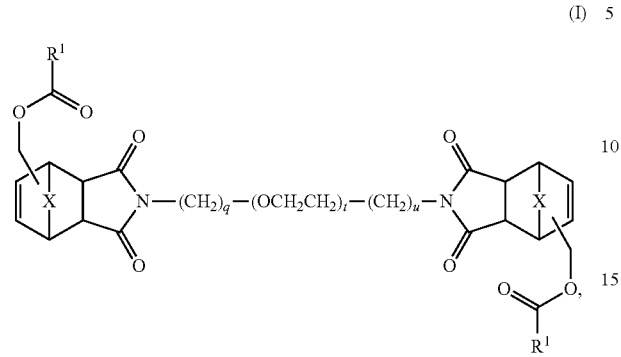
(I)

wherein:
$R^1$ is an acrylate/acrylate copolymer, an acrylate/(meth)acrylate copolymer, or a (meth)acrylate/(meth)acrylate copolymer;
X is $CH_2$, O, $S(O)_v$ or $NR^2$;
v is an integer selected from 0 to 2;
$R^2$ is hydrogen or alkyl; and
q, t and u are each integers, each independently selected from 0 to 100.

30. A process according to claim 27 wherein the crosslinked product is a compound of formula IV:

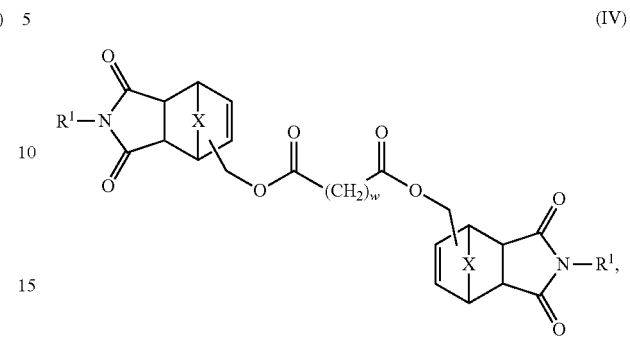
(IV)

wherein:
$R^1$ is an acrylate/acrylate copolymer, an acrylate/(meth)acrylate copolymer, or a (meth)acrylate/(meth)acrylate copolymer;
X is O, $S(O)_v$ or $NR^2$;
v is an integer selected from 0 to 2;
$R^2$ is hydrogen or alkyl; and
w is an integer selected from 1 to 100.

* * * * *